US010645618B2

(12) United States Patent
Zhang et al.

(10) Patent No.: US 10,645,618 B2
(45) Date of Patent: *May 5, 2020

(54) LINK FAILURE RECOVERY METHOD AND APPARATUS

(71) Applicant: Huawei Technologies Co., Ltd., Shenzhen, Guangdong (CN)

(72) Inventors: Tao Zhang, Beijing (CN); Bo Lin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

This patent is subject to a terminal disclaimer.

(21) Appl. No.: 15/694,718

(22) Filed: Sep. 1, 2017

(65) Prior Publication Data

US 2017/0367015 A1    Dec. 21, 2017

Related U.S. Application Data

(63) Continuation of application No. 15/062,768, filed on Mar. 7, 2016, now Pat. No. 9,781,637, which is a
(Continued)

(51) Int. Cl.
*H04W 36/00* (2009.01)
*H04W 76/19* (2018.01)
(Continued)

(52) U.S. Cl.
CPC .......... *H04W 36/0055* (2013.01); *H04L 1/00* (2013.01); *H04L 1/1896* (2013.01); *H04W 24/02* (2013.01);
(Continued)

(58) Field of Classification Search
CPC ... H04L 5/0098; H04L 45/28; H04L 41/0654; H04L 41/0813; H04W 24/02;
(Continued)

(56) References Cited

U.S. PATENT DOCUMENTS 6,944,473 B2 *   9/2005   Irwin ................... H04W 28/18
                                                       455/450
7,599,384 B2 *  10/2009   Vialen .................. H04W 24/02
                                                       370/437
(Continued)

FOREIGN PATENT DOCUMENTS

CN          101998469 A      3/2011
CN          102036243 A      4/2011
(Continued)

OTHER PUBLICATIONS

NTT DOCOMO, Inc., "Requirements, Candidate Solutions and Technology Roadmap for LTE Rel-12 Onward," RWS-120010, 3GPP Workshop on Release 12 and onwards, Ljubljana, Slovenia, Jun. 11-12, 2012, 27 pages.
(Continued)

*Primary Examiner* — Olumide Ajibade Akonai
(74) *Attorney, Agent, or Firm* — Kilpatrick Townsend & Stockton LLP

(57) ABSTRACT

Embodiments of the present disclosure disclose a link failure recovery method and apparatus. The method includes: first receiving, by a primary base station, failure report information sent by a user equipment, acquiring, according to the failure report information, an identifier of a data radio bearer (DRB) that needs to be reconfigured, and reconfiguring a parameter for the DRB that needs to be reconfigured; and then sending, by the primary base station, a first reconfiguration message to the user equipment, so that the user equipment reconfigures a failed DRB according to the first reconfiguration message. The present disclosure is applicable to the field of communications systems.

8 Claims, 7 Drawing Sheets

Related U.S. Application Data continuation of application No. 14/609,881, filed on Jan. 30, 2015, now Pat. No. 9,313,820, which is a continuation of application No. PCT/CN2012/079403, filed on Jul. 31, 2012.

(51) Int. Cl.

| | | |
|---|---|---|
| *H04W 36/30* | (2009.01) | |
| *H04L 1/00* | (2006.01) | |
| *H04L 1/18* | (2006.01) | |
| *H04W 24/02* | (2009.01) | |
| *H04W 24/04* | (2009.01) | |
| *H04W 24/10* | (2009.01) | |
| *H04W 88/02* | (2009.01) | |
| *H04W 88/08* | (2009.01) | |

(52) U.S. Cl.
CPC ........... *H04W 24/04* (2013.01); *H04W 24/10* (2013.01); *H04W 36/305* (2018.08); *H04W 76/19* (2018.02); *H04L 2001/0093* (2013.01); *H04W 36/0069* (2018.08); *H04W 88/02* (2013.01); *H04W 88/08* (2013.01)

(58) Field of Classification Search
CPC ..... H04W 28/18; H04W 76/20; H04W 76/04; H04W 76/022; H04W 72/042; H04W 76/02; H04W 76/046; H04W 24/04; H04W 76/027; H04W 88/08; H04W 72/0453; H04W 36/305; H04W 36/0055; H04W 84/045; H04W 36/0069; H04W 36/30; H04W 72/0406; H04W 76/15; H04W 92/10; H04W 36/0072
See application file for complete search history.

(56) References Cited

U.S. PATENT DOCUMENTS

| | | | | |
|---|---|---|---|---|
| 9,313,820 | B2* | 4/2016 | Zhang | ............... H04W 36/0055 |
| 9,781,637 | B2* | 10/2017 | Zhang | ............... H04W 36/0055 |
| 2004/0037224 | A1* | 2/2004 | Choi | ................... H04L 1/1812 370/235 |
| 2009/0103511 | A1* | 4/2009 | Marinier | ................ H04L 47/36 370/345 |
| 2011/0002262 | A1* | 1/2011 | Wang | ................ H04W 74/0833 370/328 |
| 2011/0077010 | A1 | 3/2011 | Xu et al. | |
| 2011/0134774 | A1 | 6/2011 | Pelletier et al. | |
| 2011/0194630 | A1 | 8/2011 | Yang et al. | |
| 2013/0250857 | A1 | 9/2013 | Lu | |
| 2015/0071056 | A1 | 3/2015 | Yi et al. | |
| 2015/0223178 | A1 | 8/2015 | Pietraski et al. | |

FOREIGN PATENT DOCUMENTS

| | | |
|---|---|---|
| CN | 102036284 A | 4/2011 |
| CN | 102223658 A | 10/2011 |
| CN | 102457970 A | 5/2012 |
| CN | 102595640 A | 7/2012 |
| EP | 2648440 A1 | 10/2013 |
| JP | 2012533210 A | 12/2012 |
| JP | 2013520108 A | 5/2013 |
| JP | 2013544474 A | 12/2013 |
| WO | 2010037133 A1 | 4/2010 |
| WO | 2011100673 A1 | 8/2011 |
| WO | 2012071704 A1 | 6/2012 |

OTHER PUBLICATIONS

NEC, "Consideration of the possible structures on the dual connectivity," R3-130138, 3GPP TSG-RAN WG3 Meeting #79, St. Julian's, Malta, Jan. 28-Feb. 1, 2013, 5 pages.

Huawei, "RACH-less handover in CoMP", 3GPP TSG RAN WG2 Meeting #67, Aug. 24-28, 2009, 2 pages, R2-094787.

InterDigital Communications, "Release of PUCCH resources and removal of SCell Configuration", 3GPP TSG-RAN WG2 #71 Tdoc, Aug. 23-27, 2010, 12 pages, R2-104814.

Rapporteur (Samsung), "Introduction of Carrier Aggregation and UL/DL MIMO", Change Request, 3GPP TSG-RAN WG2 Meeting #72, Nov. 15-19, 2010, 88 pages, R2-106856.

* cited by examiner

LINK FAILURE RECOVERY METHOD AND APPARATUS

CROSS-REFERENCE TO RELATED APPLICATIONS

This application is a continuation of U.S. patent application Ser. No. 15/062,768, filed on Mar. 7, 2016, which is a continuation of U.S. patent application Ser. No. 14/609,881, filed on Jan. 30, 2015, now U.S. Pat. No. 9,313,820, which is a continuation of International Application No. PCT/CN2012/079403, filed on Jul. 31, 2012. The afore-mentioned patent applications are hereby incorporated by reference in their entireties.

TECHNICAL FIELD

The present application relates to the field of communications systems, and in particular, to a link failure recovery method and apparatus.

BACKGROUND

A type of network deployment has been introduced in a next generation wireless network. In this type of deployment, one base station serves two different cells, and a user equipment may simultaneously keep connections to the two different cells served by the base station. Of the two cells that simultaneously keep connections to the user equipment, one is a primary serving cell and the other is a secondary serving cell.

In the prior art, after the user equipment detects that a radio link failure occurs on a link between the user equipment and the primary serving cell, the link may recover from the radio link failure by using an re-establishing process. In this process, a signaling radio bearer (SRB) between the user equipment and the base station is re-established, and security between the user equipment and the base station is reactivated. In a new type of network deployment, the primary serving cell and the secondary serving cell may also belong to different base stations. A base station to which the primary serving cell belongs may be referred to as a primary base station, and a base station to which the secondary serving cell belongs may be referred to as a secondary base station. When the user equipment detects that a radio link failure occurs on a link between the user equipment and the secondary base station, a signaling radio bearer between the user equipment and the primary base station is still re-established and security between the user equipment and the primary base station is reactivated in the prior art. However, probably no radio link failure occurs between the user equipment and the primary base station at this moment. In this case, the signaling radio bearer between a terminal and the primary base station does not need to be re-established and the security between the user equipment and the primary base station also does not need to be reactivated. As a result, unnecessary information interaction between the user equipment and the primary base station increases, and a network resource is wasted.

SUMMARY

The present disclosure provides a link failure recovery method and apparatus, avoiding unnecessary information interaction between a user equipment and a primary base station, and improving network resource utilization efficiency.

Technical solutions adopted in embodiments of the present disclosure are as follows:

A first aspect of the disclosure provides a link failure recovery method includes:

receiving, by a primary base station, failure report information sent by a user equipment, where the failure report information is an identifier of a failed secondary serving cell or an identifier of a failed data radio bearer DRB, where the failed secondary serving cell is controlled by a secondary base station, and the failed DRB is carried on a radio link between the failed secondary serving cell and the user equipment;

acquiring, by the primary base station according to the failure report information, an identifier of a DRB that needs to be reconfigured, and reconfiguring a parameter for the DRB that needs to be reconfigured; and sending, by the primary base station, a first reconfiguration message to the user equipment, where the first reconfiguration message includes the identifier of the DRB that needs to be reconfigured and the parameter reconfigured for the DRB that needs to be reconfigured.

A second aspect of the disclosure provides a link failure recovery method includes:

receiving, by a primary base station, failure report information sent by a secondary base station, where the failure report information includes an identifier of a failed user equipment, or an identifier of a failed user equipment and an identifier of a failed secondary serving cell, or an identifier of a failed user equipment and an identifier of a failed radio access bearer E-RAB;

acquiring, by the primary base station according to the failure report information, an identifier of a data radio bearer DRB that needs to be reconfigured, and reconfiguring a parameter for the DRB that needs to be reconfigured; and sending, by the primary base station, a first reconfiguration message to the user equipment, where the first reconfiguration message includes the identifier of the DRB that needs to be reconfigured and the parameter reconfigured for the DRB, so that the user equipment reconfigures, according to the first reconfiguration message, the DRB that needs to be reconfigured.

In a first implementation of the second aspect of the disclosure, before the receiving, by a primary base station, failure report information sent by a secondary base station, further comprising:

sending, by the primary base station, a failure detection configuration message to the secondary base station, so that the secondary base station determines, according to the failure detection configuration message, the identifier of the failed user equipment, or the identifier of the failed user equipment and the identifier of the failed secondary serving cell, or the identifier of the failed user equipment and the identifier of the failed E-RAB; wherein the message comprises at least one of the following: the maximum number of Radio Link Control RLC downlink retransmissions, the maximum number of retransmissions of a physical downlink control channel PDCCH order for allocating a dedicated random access resource, the maximum number of attempts for receiving a random access request, and a threshold for a block error rate BLER or a bit error rate BER of uplink data.

In a second implementation of the second aspect of the disclosure, further comprising:

acquiring, by the primary base station according to the failure report information, an identifier of a secondary serving cell that needs to be deleted; wherein the first reconfiguration message further comprises the identifier of the secondary serving cell that needs to be deleted, so that the user equipment releases, according to the identifier of the secondary serving cell that needs to be deleted, the secondary serving cell that needs to be deleted.

In a third implementation of the second aspect of the disclosure, further comprising: sending, by the primary base station, a second reconfiguration message to the secondary base station, wherein the second reconfiguration message comprises the identifier of the failed user equipment, so that the secondary base station releases, according to the second reconfiguration message, a resource serving the failed user equipment.

Combine with the third implementation of the second aspect of the disclosure, in the fourth implementation of the second aspect of the disclosure, further comprising:

acquiring, by the primary base station according to the failure report information, an identifier of a secondary serving cell that needs to be deleted or an identifier of an E-RAB that needs to be deleted; wherein the second reconfiguration message further comprises the identifier of the secondary serving cell that needs to be deleted or the identifier of the E-RAB that needs to be deleted, so that the secondary base station releases, according to the second reconfiguration message, the secondary serving cell that needs to be deleted or the E-RAB that needs to be deleted.

A third aspect of the disclosure provides a link failure recovery method includes:

sending, by a user equipment, failure report information to a primary base station, where the failure report information is an identifier of a failed secondary serving cell or an identifier of a failed data radio bearer DRB, where the failed secondary serving cell is controlled by a secondary base station, and the failed DRB is carried on a radio link between the failed secondary serving cell and the user equipment, so that the primary base station acquires, according to the failure report information, an identifier of a DRB that needs to be reconfigured and reconfigures a parameter for the DRB that needs to be reconfigured;

receiving, by the user equipment, a reconfiguration message sent by the primary base station, where the reconfiguration message includes the identifier of the DRB that needs to be reconfigured and the parameter reconfigured for the DRB; and reconfiguring, by the user equipment according to the reconfiguration message, the DRB that needs to be reconfigured.

A fourth aspect of the disclosure provides a link failure recovery method includes:

sending, by a secondary base station, failure report information to a primary base station, where the failure report information is an identifier of a failed user equipment, or an identifier of a failed user equipment and an identifier of a failed secondary serving cell, or an identifier of a failed user equipment and an identifier of a failed E-RAB, so that the primary base station acquires, according to the failure report information, an identifier of a DRB that needs to be reconfigured and reconfigures a parameter for the DRB that needs to be reconfigured.

In a first implementation of the fourth aspect of the disclosure, before the sending, by a secondary base station, failure report information to a primary base station, further comprising:

receiving, by the secondary base station, a failure detection configuration message sent by the primary base station, wherein the failure detection configuration message comprises at least one of the following: the maximum number of Radio Link Control RLC downlink retransmissions, the maximum number of retransmissions of a physical downlink control channel PDCCH order for allocating a dedicated random access resource, the maximum number of attempts for receiving a random access request, and a threshold for a block error rate BLER or a bit error rate BER of uplink data; and determining, by the secondary base station according to the failure detection configuration message, the identifier of the failed user equipment, or the identifier of the failed user equipment and the identifier of the failed secondary serving cell, or the identifier of the failed user equipment and the identifier of the failed E-RAB.

In a second implementation of the fourth aspect of the disclosure, after the sending, by a secondary base station, failure report information to a primary base station, further comprising:

receiving, by the secondary base station, a reconfiguration message sent by the primary base station, wherein the reconfiguration message comprises the identifier of the failed user equipment; and releasing, by the secondary base station according to the reconfiguration message, a resource serving the failed user equipment.

Combine with the second implementation of the fourth aspect of the disclosure, in the third implementation of the fourth aspect of the disclosure, wherein:

the reconfiguration message further comprises an identifier of a secondary serving cell that needs to be deleted or an identifier of an E-RAB that needs to be deleted, and the identifier of the secondary serving cell that needs to be deleted or the identifier of the E-RAB that needs to be deleted is determined by the primary base station according to the failure report information; and the secondary base station releases, according to the identifier of the failed user equipment and the identifier of the secondary serving cell that needs to be deleted, the secondary serving cell that needs to be deleted and serves the failed user equipment; or the secondary base station releases, according to the identifier of the failed user equipment and the identifier of the E-RAB that needs to be deleted, the E-RAB that needs to be deleted.

A fifth aspect of the disclosure provides a link failure recovery apparatus includes:

a receiving unit, configured to receive failure report information sent by a user equipment, where the failure report information is an identifier of a failed secondary serving cell or an identifier of a failed data radio bearer DRB, where the failed secondary serving cell is controlled by a secondary base station, and the failed DRB is carried on a radio link between the failed secondary serving cell and the user equipment;

an acquiring unit, configured to acquire, according to the failure report information, an identifier of a DRB that needs to be reconfigured;

a configuring unit, configured to reconfigure a parameter for the DRB that needs to be reconfigured; and a sending unit, configured to send a first reconfiguration message to the user equipment, where the first reconfiguration message includes the identifier of the DRB that needs to be reconfigured and the parameter reconfigured for the DRB.

In a first implementation of the fifth aspect of the disclosure, wherein:

the receiving unit is further configured to receive failure cause information sent by the user equipment, wherein the failure cause information is that the maximum number of Radio Link Control RLC uplink retransmissions is reached, or that the maximum number of random access preamble retransmissions is reached, or that a timer T310 expires.

Combine with the fifth aspect of the disclosure or the first implementation of the fifth aspect of the disclosure, in a second implementation of the fifth aspect of the disclosure, wherein:

the sending unit is further configured to send a failure detection configuration message to the user equipment, so that the user equipment determines, according to the failure detection configuration message, a specific value of the failure report information and/or the failure cause information; wherein the failure detection configuration message specifically comprises at least one of the following: the maximum number of Radio Link Control RLC uplink retransmissions, the maximum number of random access preamble retransmissions, and timing duration of the timer T310.

Combine with the first implementation of the fifth aspect of the disclosure, in a third implementation of the fifth aspect of the disclosure, wherein:

the configuring unit is specifically configured to, when the failure cause information is that the maximum number of RLC uplink retransmissions is reached, reconfigure the maximum number of RLC uplink retransmissions for the DRB;

the configuring unit is specifically further configured to, when the failure cause information is that the maximum number of random access preamble retransmissions is reached, reconfigure the maximum number of preamble transmissions for the DRB; and the configuring unit is specifically further configured to, when the failure cause information is that a timer T310 expires, reconfigure timing duration of the timer T310 for the DRB.

In a fourth implementation of the fifth aspect of the disclosure, wherein:

the acquiring unit is further configured to acquire, according to the failure report information, an identifier of a secondary serving cell that needs to be deleted; and the first reconfiguration message further comprises the identifier of the secondary serving cell that needs to be deleted, so that the user equipment releases, according to the identifier of the secondary serving cell that needs to be deleted, the secondary serving cell that needs to be deleted.

In a fifth implementation of the fifth aspect of the disclosure, wherein:

the sending unit is further configured to send a second reconfiguration message to the secondary base station, wherein the second reconfiguration message comprises an identifier of the user equipment, so that the secondary base station releases, according to the identifier of the user equipment, a resource serving the user equipment.

Combine with the fifth implementation of the fifth aspect of the disclosure, in a sixth implementation of the fifth aspect of the disclosure, wherein:

the acquiring unit is further configured to acquire, according to the failure report information, an identifier of a secondary serving cell that needs to be deleted or an identifier of a radio access bearer E-RAB that needs to be deleted, wherein the E-RAB corresponds, on a one-to-one basis, to the DRB; and the second reconfiguration message further comprises the identifier of the secondary serving cell that needs to be deleted or the identifier of the E-RAB that needs to be deleted, so that the secondary base station releases, according to the second reconfiguration message, the secondary serving cell that needs to be deleted or the E-RAB that needs to be deleted.

A sixth aspect of the disclosure provides a link failure recovery apparatus includes:

a receiving unit, configured to receive failure report information sent by a secondary base station, where the failure report information includes an identifier of a failed user equipment;

an acquiring unit, configured to acquire, according to the failure report information, an identifier of the data radio bearer DRB that needs to be reconfigured, or an identifier of a failed user equipment and an identifier of a failed secondary serving cell, or an identifier of a failed user equipment and an identifier of a failed radio access bearer E-RAB;

a configuring unit, configured to reconfigure a parameter for the DRB that needs to be reconfigured; and a sending unit, configured to send a first reconfiguration message to the user equipment, where the first reconfiguration message includes the identifier of the DRB that needs to be reconfigured and the parameter reconfigured for the DRB.

A seventh aspect of the disclosure provides a link failure recovery apparatus, comprising:

a receiving unit, configured to receive failure report information sent by a secondary base station, wherein the failure report information comprises an identifier of a failed user equipment, or an identifier of a failed user equipment and an identifier of a failed secondary serving cell, or an identifier of a failed user equipment and an identifier of a failed radio access bearer E-RAB;

an acquiring unit, configured to acquire, according to the failure report information, an identifier of a data radio bearer DRB that needs to be reconfigured;

a configuring unit, configured to reconfigure a parameter for the DRB that needs to be reconfigured; and a sending unit, configured to send a first reconfiguration message to the user equipment, wherein the first reconfiguration message comprises the identifier of the DRB that needs to be reconfigured and the parameter reconfigured for the DRB, so that the user equipment reconfigures, according to the first reconfiguration message, the DRB that needs to be reconfigured.

In a first implementation of the seventh aspect of the disclosure, wherein:

the sending unit is further configured to send a failure detection configuration message to the secondary base station, so that the secondary base station determines, according to the failure detection configuration message, the identifier of the failed user equipment, or the identifier of the failed user equipment and the identifier of the failed secondary serving cell, or the identifier of the failed user equipment and the identifier of the failed E-RAB; wherein the failure detection configuration message comprises at least one of the following: the maximum number of Radio Link Control RLC downlink retransmissions, the maximum number of retransmissions of a physical downlink control channel PDCCH order for allocating a dedicated random access resource, the maximum number of attempts for receiving a random access request, and a threshold for a block error rate BLER or a bit error rate BER of uplink data.

In a second implementation of the seventh aspect of the disclosure, wherein:

the acquiring unit is further configured to acquire, according to the failure report information, an identifier of a secondary serving cell that needs to be deleted; and the first reconfiguration message further comprises the identifier of the secondary serving cell that needs to be deleted, so that the user equipment releases, according to the identifier of the secondary serving cell that needs to be deleted, the secondary serving cell that needs to be deleted.

In a third implementation of the seventh aspect of the disclosure, wherein:

the sending unit is further configured to send a second reconfiguration message to the secondary base station, wherein the second reconfiguration message comprises the identifier of the failed user equipment, so that the secondary base station releases, according to the second reconfiguration message, a resource serving the failed user equipment.

Combine with the third implementation of the seventh aspect of the disclosure, in a fourth implementation of the seventh aspect of the disclosure, wherein:

the acquiring unit is further configured to acquire, according to the failure report information, an identifier of a secondary serving cell that needs to be deleted or an identifier of an E-RAB that needs to be deleted; and the second reconfiguration message further comprises the identifier of the secondary serving cell that needs to be deleted or the identifier of the E-RAB that needs to be deleted, so that the secondary base station releases, according to the second reconfiguration message, the secondary serving cell that needs to be deleted or the E-RAB that needs to be deleted.

A eighth aspect of the disclosure provides a base station, comprising: a processor, an input device, an output device, and a memory, wherein the input device, the output device, and the memory are connected to the processor; and the processor comprises: a receiving unit, an acquiring unit, a configuring unit, and a sending unit, wherein:

the receiving unit is configured to receive failure report information sent by a secondary base station, wherein the failure report information comprises an identifier of a failed user equipment, or an identifier of a failed user equipment and an identifier of a failed secondary serving cell, or an identifier of a failed user equipment and an identifier of a failed radio access bearer E-RAB;

the acquiring unit is configured to acquire, according to the failure report information, an identifier of a data radio bearer DRB that needs to be reconfigured;

the configuring unit is configured to reconfigure a parameter for the DRB that needs to be reconfigured; and the sending unit is configured to send a first reconfiguration message to the user equipment, wherein the first reconfiguration message comprises the identifier of the DRB that needs to be reconfigured and the parameter reconfigured for the DRB, so that the user equipment reconfigures, according to the first reconfiguration message, the DRB that needs to be reconfigured.

In a first implementation of the eighth aspect of the disclosure, wherein:

the sending unit is further configured to send a failure detection configuration message to the secondary base station, so that the secondary base station determines, according to the failure detection configuration message, the identifier of the failed user equipment, or the identifier of the failed user equipment and the identifier of the failed secondary serving cell, or the identifier of the failed user equipment and the identifier of the failed E-RAB; wherein the failure detection configuration message comprises at least one of the following: the maximum number of Radio Link Control RLC downlink retransmissions, the maximum number of retransmissions of a physical downlink control channel PDCCH order for allocating a dedicated random access resource, the maximum number of attempts for receiving a random access request, and a threshold for a block error rate BLER or a bit error rate BER of uplink data.

In a second implementation of the eighth aspect of the disclosure, wherein:

the acquiring unit is further configured to acquire, according to the failure report information, an identifier of a secondary serving cell that needs to be deleted; and the first reconfiguration message further comprises the identifier of the secondary serving cell that needs to be deleted, so that the user equipment releases, according to the identifier of the secondary serving cell that needs to be deleted, the secondary serving cell that needs to be deleted.

In a third implementation of the eighth aspect of the disclosure, wherein:

the sending unit is further configured to send a second reconfiguration message to the secondary base station, wherein the second reconfiguration message comprises the identifier of the failed user equipment, so that the secondary base station releases, according to the second reconfiguration message, a resource serving the failed user equipment.

Combine with the third implementation of the eighth aspect of the disclosure, in a fourth implementation of the eighth aspect of the disclosure, wherein:

the acquiring unit is further configured to acquire, according to the failure report information, an identifier of a secondary serving cell that needs to be deleted or an identifier of an E-RAB that needs to be deleted; and the second reconfiguration message further comprises the identifier of the secondary serving cell that needs to be deleted or the identifier of the E-RAB that needs to be deleted, so that the secondary base station releases, according to the second reconfiguration message, the secondary serving cell that needs to be deleted or the E-RAB that needs to be deleted.

A ninth aspect of the disclosure provides a link failure recovery apparatus includes:

a sending unit, configured to send failure report information to a primary base station, where the failure report information is an identifier of a failed secondary serving cell or an identifier of a failed data radio bearer DRB, where the failed secondary serving cell is controlled by a secondary base station, and the failed DRB is carried on a radio link between the failed secondary serving cell and a user equipment, so that the primary base station acquires, according to the failure report information, an identifier of a DRB that needs to be reconfigured and reconfigures a parameter for the DRB that needs to be reconfigured;

a receiving unit, configured to receive a reconfiguration message sent by the primary base station, where the reconfiguration message includes the identifier of the DRB that needs to be reconfigured and the parameter reconfigured for the DRB; and a configuring unit, configured to reconfigure, according to the reconfiguration message, the DRB that needs to be reconfigured.

In a first implementation of the ninth aspect of the disclosure, wherein:

the sending unit is further configured to send failure cause information to the primary base station, wherein the failure cause information is that the maximum number of Radio Link Control RLC uplink retransmissions is reached, or that the maximum number of random access preamble retransmissions is reached, or that a timer T310 expires, so that the primary base station reconfigures, according to the failure cause information, a parameter for the DRB that needs to be reconfigured.

Combine with the ninth aspect of the disclosure or the first implementation of the ninth aspect of the disclosure, in a second implementation of the eighth aspect of the disclosure, wherein:

the receiving unit is further configured to receive a failure detection configuration message sent by the primary base station, wherein the failure detection configuration message specifically comprises at least one of the following: the maximum number of Radio Link Control RLC uplink retransmissions, the maximum number of random access preamble retransmissions, and timing duration of the timer T310; and the sending unit is further configured to determine, according to the failure detection configuration message, a specific value of the failure report information or the failure cause information.

In a third implementation of the ninth aspect of the disclosure, wherein: the reconfiguration message further comprises an identifier of a secondary serving cell that needs to be deleted, and the identifier of the secondary serving cell that needs to be deleted is acquired by the primary base station according to the failure report information; and the apparatus further comprises a releasing unit; wherein the releasing unit is configured to release, according to the identifier of the secondary serving cell that needs to be deleted, the secondary serving cell that needs to be deleted.

A tenth aspect of the disclosure provides a link failure recovery apparatus includes:

a sending unit, configured to send failure report information to a primary base station, where the failure report information is an identifier of a failed user equipment, or an identifier of a failed user equipment and an identifier of a failed secondary serving cell, or an identifier of a failed user equipment and an identifier of a failed E-RAB, so that the primary base station acquires, according to the failure report information, an identifier of a DRB that needs to be reconfigured and reconfigures a parameter for the DRB that needs to be reconfigured.

In a first implementation of the tenth aspect of the disclosure, further comprising:

a receiving unit, configured to receive a failure detection configuration message sent by the primary base station, wherein the failure detection configuration message comprises at least one of the following: the maximum number of Radio Link Control RLC downlink retransmissions, the maximum number of retransmissions of a physical downlink control channel PDCCH order for allocating a dedicated random access resource, the maximum number of attempts for receiving a random access request, and a threshold for a block error rate BLER or a bit error rate BER of uplink data; and a determining unit, configured to determine, according to the failure detection configuration message, the identifier of the failed user equipment, or the identifier of the failed user equipment and the identifier of the failed secondary serving cell, or the identifier of the failed user equipment and the identifier of the failed E-RAB.

In a second implementation of the tenth aspect of the disclosure, wherein:

the receiving unit is further configured to receive a reconfiguration message sent by the primary base station, wherein the reconfiguration message comprises the identifier of the failed user equipment; and the apparatus further comprises a releasing unit; wherein the releasing unit is configured to release, according to the reconfiguration message, a resource serving the failed user equipment.

In a third implementation of the tenth aspect of the disclosure, wherein: the reconfiguration message further comprises an identifier of a secondary serving cell that needs to be deleted or an identifier of an E-RAB that needs to be deleted, and the identifier of the secondary serving cell that needs to be deleted or the identifier of the E-RAB that needs to be deleted is determined by the primary base station according to the failure report information; and the releasing unit is further configured to release, according to the identifier of the failed user equipment and the identifier of the secondary serving cell that needs to be deleted, the secondary serving cell that needs to be deleted and serves the failed user equipment; or the releasing unit is further configured to release, according to the identifier of the failed user equipment and the identifier of the E-RAB that needs to be deleted, the E-RAB that needs to be deleted.

A eleventh aspect of the disclosure provides a base station, comprising: a processor, an input device, an output device, and a memory, wherein the input device, the output device, and the memory are connected to the processor; and the processor comprises a sending unit; wherein:

the sending unit is configured to send failure report information to a primary base station, wherein the failure report information is an identifier of a failed user equipment, or an identifier of a failed user equipment and an identifier of a failed secondary serving cell, or an identifier of a failed user equipment and an identifier of a failed E-RAB, so that the primary base station acquires, according to the failure report information, an identifier of a DRB that needs to be reconfigured and reconfigures a parameter for the DRB that needs to be reconfigured.

In a first implementation of the eleventh aspect of the disclosure, further comprising:

a receiving unit, configured to receive a failure detection configuration message sent by the primary base station, wherein the failure detection configuration message comprises at least one of the following: the maximum number of Radio Link Control RLC downlink retransmissions, the maximum number of retransmissions of a physical downlink control channel PDCCH order for allocating a dedicated random access resource, the maximum number of attempts for receiving a random access request, and a threshold for a block error rate BLER or a bit error rate BER of uplink data; and a determining unit, configured to determine, according to the failure detection configuration message, the identifier of the failed user equipment, or the identifier of the failed user equipment and the identifier of the failed secondary serving cell, or the identifier of the failed user equipment and the identifier of the failed E-RAB.

In a second implementation of the eleventh aspect of the disclosure, wherein:

the receiving unit is further configured to receive a reconfiguration message sent by the primary base station, wherein the reconfiguration message comprises the identifier of the failed user equipment; and the apparatus further comprises a releasing unit; wherein the releasing unit is configured to release, according to the reconfiguration message, a resource serving the failed user equipment.

In a third implementation of the eleventh aspect of the disclosure, wherein: the reconfiguration message further comprises an identifier of a secondary serving cell that needs to be deleted or an identifier of an E-RAB that needs to be deleted, and the identifier of the secondary serving cell that needs to be deleted or the identifier of the E-RAB that needs to be deleted is determined by the primary base station according to the failure report information; and the releasing unit is further configured to release, according to the identifier of the failed user equipment and the identifier of the secondary serving cell that needs to be deleted, the secondary serving cell that needs to be deleted and serves the failed user equipment; or the releasing unit is further configured to release, according to the identifier of the failed user equipment and the identifier of the E-RAB that needs to be deleted, the E-RAB that needs to be deleted.

In a link failure recovery method and apparatus provided in embodiments of the present disclosure, a primary base station first receives failure report information sent by a user equipment, acquires, according to the failure report information, an identifier of a DRB that needs to be reconfigured, and reconfigures a parameter for the DRB that needs to be reconfigured; and then the primary base station sends a first reconfiguration message to the user equipment, so that the user equipment reconfigures a failed DRB according to the first reconfiguration message. Currently, when the user equipment detects that a radio link failure occurs on a link between the user equipment and a secondary base station, a signaling radio bearer between the user equipment and the primary base station is still re-established, and security between the user equipment and the primary base station is reactivated. However, probably no radio link failure occurs between the user equipment and the primary base station at this moment. As a result, unnecessary information interaction between the user equipment and the primary base station increases, and a network resource is wasted. In the method and apparatus provided in the embodiments of the present disclosure, the signaling radio bearer between the user equipment and the primary base station does not need to be re-established, and the security between the user equipment and the primary base station does not need to be reactivated, avoiding unnecessary information interaction between the user equipment and the primary base station, and improving network resource utilization efficiency. Further, the method and apparatus provided in the embodiments of the present disclosure may enable the primary base station to locate a failure cause more accurately, thereby implementing link failure recovery at a lower cost.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

To make the advantages of the technical solutions of the present disclosure clearer, the following describes the present disclosure in detail with reference to the accompanying drawings and embodiments.

Figure 1:
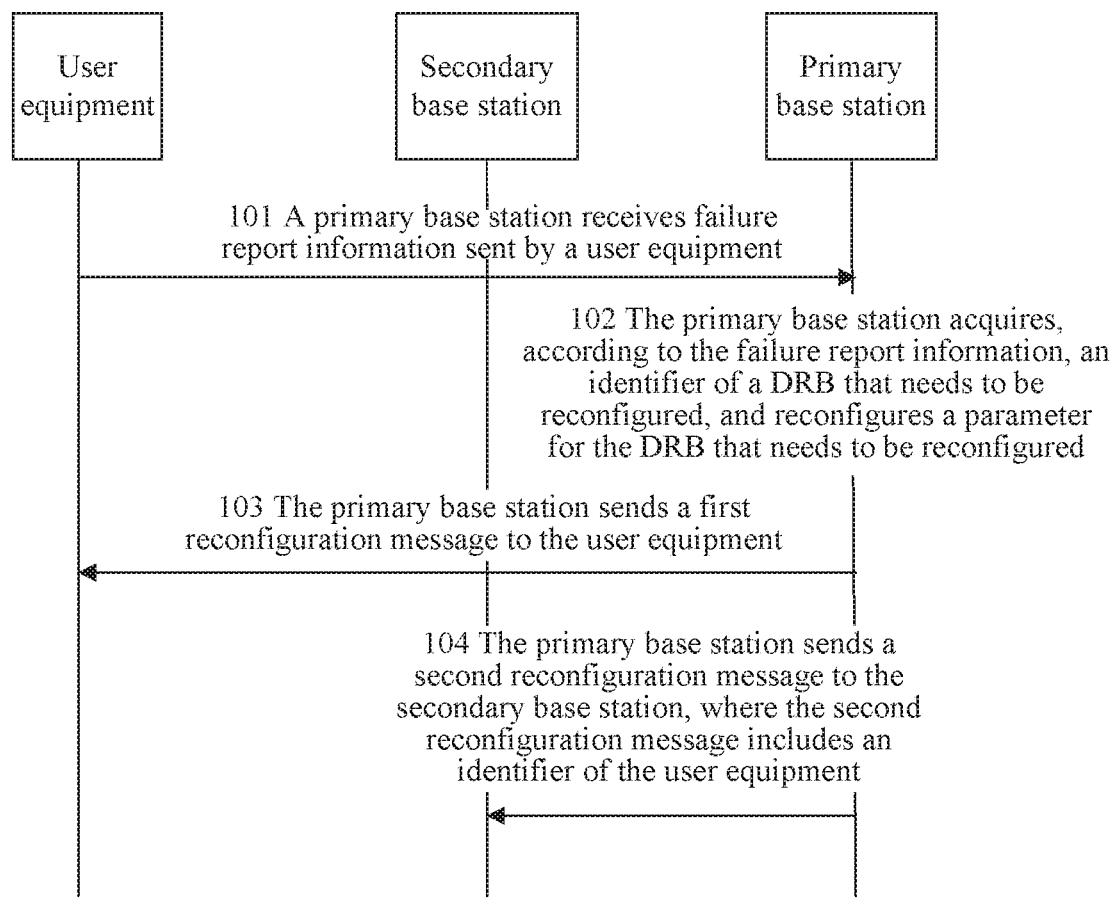
FIG. 1 is a flowchart of a link failure recovery method according to an embodiment of the present disclosure.

An embodiment of the present disclosure provides a link failure recovery method. As shown in FIG. 1, the method includes:

101. A primary base station receives failure report information sent by a user equipment.

The failure report information is an identifier of a failed secondary serving cell or an identifier of a failed data radio bearer (DRB), where the failed secondary serving cell is controlled by a secondary base station, and the failed DRB is carried on a radio link between the failed secondary serving cell and the user equipment.

Optionally, the primary base station receives failure cause information sent by the user equipment, where the failure cause information is that the maximum number of RLC uplink retransmissions is reached, or that the maximum number of random access preamble retransmissions is reached, or that a timer T310 expires.

Optionally, before step 101 or before the primary base station receives the failure cause information sent by the user equipment, the method may further include: sending, by the primary base station, a failure detection configuration message to the user equipment, where the message may specifically include one or more of the following: the maximum number of RLC uplink retransmissions, the maximum number of random access preamble retransmissions, and timing duration of the timer T310, so that the user equipment determines, according to the failure detection configuration message, the identifier of the failed secondary serving cell or the identifier of the failed DRB or a specific value of a failure cause information.

Specifically, when the maximum number of RLC uplink retransmissions is reached for the DRB that is carried on the radio link between the user equipment and the secondary serving cell, the user equipment determines that an identifier of the secondary serving cell is the identifier of the failed secondary serving cell, or the user equipment determines that an identifier of the DRB is the identifier of the failed DRB. When the maximum number of random access preamble retransmissions is reached, or the timing duration of the timer T310 is reached on the secondary serving cell for the user equipment, the user equipment determines that an identifier of the secondary serving cell is the identifier of the failed secondary serving cell, or the user equipment determines that an identifier of the DRB that is carried on the radio link between the user equipment and the secondary serving cell is the identifier of the failed DRB.

102. The primary base station acquires, according to the failure report information, an identifier of a DRB that needs to be reconfigured, and reconfigures a parameter for the DRB that needs to be reconfigured.

Specifically, when the failure report information is the identifier of the failed secondary serving cell, the identifier that is acquired by the primary base station and is of the DRB that needs to be reconfigured is the identifier of the DRB that is carried on the radio link between the failed secondary serving cell and the user equipment. When the failure report information is the identifier of the failed DRB, the identifier that is acquired by the primary base station and is of the DRB that needs to be reconfigured is the identifier of the failed DRB.

Optionally, the primary base station acquires, according to the failure report information, an identifier of a secondary serving cell that needs to be deleted or an identifier of a radio access bearer E-RAB that needs to be deleted, where the E-RAB corresponds, on a one-to-one basis, to the DRB.

Specifically, when the failure report information is the identifier of the failed secondary serving cell, the identifier that is acquired by the primary base station and is of the secondary serving cell that needs to be deleted is the identifier of the failed secondary serving cell, and the acquired identifier of the radio access bearer E-RAB that needs to be deleted is an identifier of an E-RAB corresponding to the DRB that is carried on the radio link between the failed secondary serving cell and the user equipment. When the failure report information is the identifier of the failed data radio bearer DRB, the identifier that is acquired by the primary base station and is of the secondary serving cell that needs to be deleted is an identifier of a secondary serving cell that carries the failed DRB, and the acquired identifier of the radio access bearer E-RAB that needs to be deleted is an identifier of an E-RAB corresponding to the failed DRB.

Optionally, when the failure cause information is that the maximum number of RLC uplink retransmissions is reached, the primary base station reconfigures the maximum number of RLC uplink retransmissions for the DRB. When the failure cause information is that the maximum number of random access preamble retransmissions is reached, the primary base station reconfigures the maximum number of preamble transmissions for the DRB. When the failure cause information is that a timer T310 expires, the primary base station reconfigures the timing duration of the timer T310 for the DRB.

103. The primary base station sends a first reconfiguration message to the user equipment.

The first reconfiguration message includes the identifier of the DRB that needs to be reconfigured and the parameter reconfigured for the DRB, so that the user equipment reconfigures, according to the first reconfiguration message, the DRB that needs to be reconfigured.

Optionally, the first reconfiguration message may further include the identifier of the secondary serving cell that needs to be deleted, so that the user equipment releases, according to the identifier of the secondary serving cell that needs to be deleted, the secondary serving cell that needs to be deleted.

104. Optionally, the primary base station sends a second reconfiguration message to the secondary base station, where the second reconfiguration message includes an identifier of the user equipment, so that the secondary base station releases, according to the identifier of the user equipment, a resource serving the user equipment.

Optionally, the second reconfiguration message may further include the identifier of the secondary serving cell that needs to be deleted or the identifier of the E-RAB that needs to be deleted, so that the secondary base station releases, according to the second reconfiguration message, the secondary serving cell that needs to be deleted or the E-RAB that needs to be deleted.

In a link failure recovery method provided in this embodiment, a signaling radio bearer between a user equipment and a primary base station does not need to be re-established, and security between the user equipment and the primary base station does not need to be reactivated, avoiding unnecessary information interaction between the user equipment and the primary base station, and improving network resource utilization efficiency.

Figure 2:
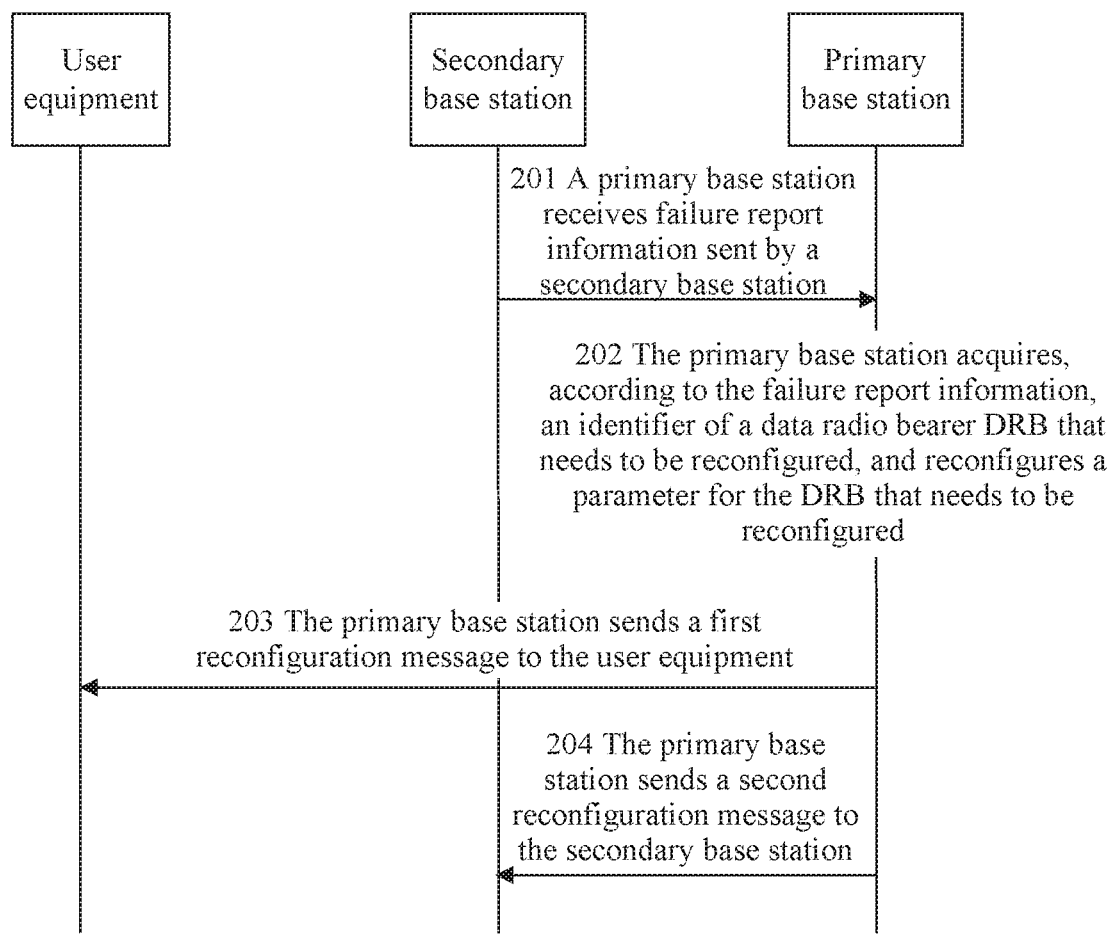
FIG. 2 is a flowchart of another link failure recovery method according to an embodiment of the present disclosure.

An embodiment of the present disclosure provides another link failure recovery method. As shown in FIG. 2, the method includes:

201. A primary base station receives failure report information sent by a secondary base station.

The failure report information includes an identifier of a failed user equipment.

Optionally, the failure report information may further include an identifier of a failed secondary serving cell or an identifier of a failed radio access bearer E-RAB.

Optionally, before step 201, the method may further include: sending, by the primary base station, a failure detection configuration message to the secondary base station, where the message may specifically include one or more of the following: the maximum number of RLC downlink retransmissions, the maximum number of retransmissions of a physical downlink control channel (PDCCH) order for allocating a dedicated random access resource, the maximum number of attempts for receiving a random access request, and a threshold for a block error rate (BLER) or a bit error rate (BER) of uplink data, so that the secondary base station determines, according to the failure detection configuration message, the identifier of the failed user equipment, and the identifier of the failed secondary serving cell or the identifier of the failed E-RAB.

Specifically, when the maximum number of RLC downlink retransmissions is reached for the DRB carried by the secondary base station, or the threshold for the BLER or the BER of the uplink data is reached, the secondary base station determines that an identifier of a user equipment to which the DRB belongs is the identifier of the failed user equipment, and the secondary base station determines that an identifier of a secondary serving cell that carries the DRB is the identifier of the failed secondary serving cell, or the secondary base station determines that an identifier of an E-RAB corresponding to the DRB is the identifier of the failed E-RAB. When the maximum number of retransmissions is reached for the PDCCH order that is used for allocating a dedicated random access resource and sent by the secondary base station to the user equipment, or the maximum number of attempts for receiving a random access request sent by the user equipment is reached, the secondary base station determines that the identifier of the user equipment is the identifier of the failed user equipment, and the secondary base station determines that the identifier of the secondary serving cell that sends the PDCCH order or receives the random access request is the identifier of the failed secondary serving cell, or the secondary base station determines that an identifier of an E-RAB corresponding to the DRB that is carried on a radio link between the failed user equipment and the failed secondary serving cell is the identifier of the failed E-RAB.

202. The primary base station acquires, according to the failure report information, an identifier of a data radio bearer DRB that needs to be reconfigured, and reconfigures a parameter for the DRB that needs to be reconfigured.

Specifically, when the failure report information is the identifier of the failed user equipment, the identifier that is acquired by the primary base station and is of the data radio bearer DRB that needs to be reconfigured is an identifier of a DRB that is carried on a radio link between the failed user equipment and the secondary base station. When the failure report information is the identifier of the failed user equipment and the identifier of the failed secondary serving cell, the identifier that is acquired by the primary base station and is of the data radio bearer DRB that needs to be reconfigured is the identifier of the DRB that is carried on the radio link between the failed user equipment and the failed secondary serving cell. When the failure report information is the identifier of the failed user equipment and the identifier of the failed radio access bearer E-RAB, the identifier that is acquired by the primary base station and is of the data radio bearer DRB that needs to be reconfigured is the identifier of the DRB corresponding to the failed radio access bearer E-RAB.

Optionally, the primary base station acquires, according to the failure report information, an identifier of a secondary serving cell that needs to be deleted or an identifier of a radio access bearer E-RAB that needs to be deleted, where the E-RAB corresponds, on a one-to-one basis, to the DRB.

Specifically, when the failure report information is the identifier of the failed user equipment, the identifier that is acquired by the primary base station and is of the secondary serving cell that needs to be deleted is an identifier of a secondary serving cell that serves the failed user equipment, and the identifier of the radio access bearer E-RAB that needs to be deleted is an identifier of an E-RAB corresponding to the DRB that is carried on the radio link between the secondary base station and the failed user equipment. When the failure report information is the identifier of the failed user equipment and the identifier of the failed secondary serving cell, the identifier that is acquired by the primary base station and is of the secondary serving cell that needs to be deleted is the identifier of the failed secondary serving cell, and the identifier of the radio access bearer E-RAB that needs to be deleted is the identifier of the E-RAB corresponding to the DRB that is carried on the radio link between the failed user equipment and the failed secondary serving cell. When the failure report information is the identifier of the failed user equipment and the identifier of the failed radio access bearer E-RAB, the identifier that is acquired by the primary base station and is of the secondary serving cell that needs to be deleted is an identifier of a secondary serving cell that carries the failed radio access bearer E-RAB, and the identifier of the radio access bearer E-RAB that needs to be deleted is the identifier of the failed radio access bearer E-RAB.

203. The primary base station sends a first reconfiguration message to the user equipment.

The first reconfiguration message includes the identifier of the DRB that needs to be reconfigured and the parameter reconfigured for the DRB, so that the user equipment reconfigures, according to the first reconfiguration message, the DRB that needs to be reconfigured.

Optionally, the first reconfiguration message may further include the identifier of the secondary serving cell that needs to be deleted, so that the user equipment releases, according to the identifier of the secondary serving cell that needs to be deleted, the secondary serving cell that needs to be deleted.

204. Optionally, the primary base station sends a second reconfiguration message to the secondary base station.

The second reconfiguration message includes the identifier of the failed user equipment, so that the secondary base station releases, according to the second reconfiguration message, a resource serving the failed user equipment.

Optionally, the second reconfiguration message further includes the identifier of the secondary serving cell that needs to be deleted or the identifier of the E-RAB that needs to be deleted, so that the secondary base station releases, according to the second reconfiguration message, the secondary serving cell that needs to be deleted or the E-RAB that needs to be deleted.

In another link failure recovery method provided in this embodiment, a signaling radio bearer between a user equipment and a primary base station does not need to be re-established, and security between the user equipment and the primary base station does not need to be reactivated, avoiding unnecessary information interaction between the user equipment and the primary base station, and improving network resource utilization efficiency.

Figure 3:
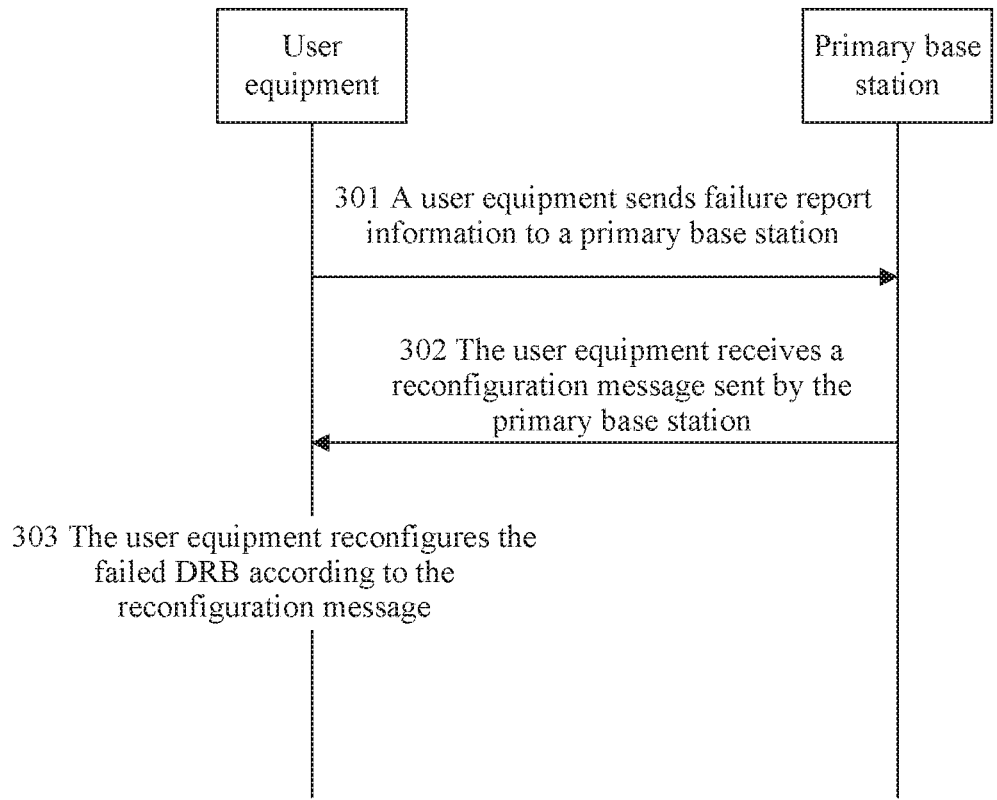
FIG. 3 is a flowchart of still another link failure recovery method according to an embodiment of the present disclosure.

An embodiment provides of the present disclosure still another link failure recovery method. As shown in FIG. 3, the method includes:

301. A user equipment sends failure report information to a primary base station.

The failure report information is an identifier of a failed secondary serving cell or an identifier of a failed data radio bearer DRB, where the failed secondary serving cell is controlled by a secondary base station, and the failed DRB is carried on a radio link between the failed secondary serving cell and the user equipment, so that the primary base station acquires, according to the failure report information, an identifier of a DRB that needs to be reconfigured and reconfigures a parameter for the DRB that needs to be reconfigured.

Optionally, the user equipment sends failure cause information to the primary base station, where the failure cause information is that the maximum number of RLC uplink retransmissions is reached, or that the maximum number of random access preamble retransmissions is reached, or that a timer T310 expires, so that the primary base station reconfigures, according to the failure cause information, a parameter for the DRB that needs to be reconfigured.

Optionally, before step 301 or before the user equipment sends the failure cause information to the primary base station, the method may further include: receiving, by the user equipment, a failure detection configuration message sent by the primary base station, where the message may specifically include one or more of the following: the maximum number of RLC uplink retransmissions, the maximum number of random access preamble retransmissions, and timing duration of the timer T310; and determining, by the user equipment according to the failure detection configuration message, the identifier of the failed secondary serving cell or the identifier of the failed DRB or a specific value of the failure cause.

Specifically, when the maximum number of RLC uplink retransmissions is reached for the DRB that is carried on the radio link between the user equipment and the secondary serving cell, the user equipment determines that an identifier of the secondary serving cell is the identifier of the failed secondary serving cell, or the user equipment determines that an identifier of the DRB is the identifier of the failed DRB. When the maximum number of random access preamble retransmissions or the timing duration of the timer T310 is reached on the secondary serving cell for the user equipment, the user equipment determines that an identifier of the secondary serving cell is the identifier of the failed secondary serving cell, or the user equipment determines that an identifier of the DRB that is carried on the radio link between the user equipment and the secondary serving cell is the identifier of the failed DRB.

302. The user equipment receives a reconfiguration message sent by the primary base station.

The reconfiguration message includes the identifier of the DRB that needs to be reconfigured and the parameter reconfigured for the DRB, so that the user equipment reconfigures, according to the reconfiguration message, the DRB that needs to be reconfigured.

Specifically, when the failure report information is the identifier of the failed secondary serving cell, the identifier of the DRB that needs to be reconfigured is the identifier of the DRB that is carried on the radio link between the failed secondary serving cell and the user equipment. When the failure report information is the identifier of the failed DRB, the identifier of the DRB that needs to be reconfigured is the identifier of the failed DRB.

Optionally, the reconfiguration message may further include an identifier of a secondary serving cell that needs to be deleted.

Specifically, when the failure report information is the identifier of the failed secondary serving cell, the identifier of the secondary serving cell that needs to be deleted is the identifier of the failed secondary serving cell. When the failure report information is the identifier of the failed data radio bearer DRB, the identifier of the secondary serving cell that needs to be deleted is an identifier of a secondary serving cell that carries the failed DRB.

303. The user equipment reconfigures, according to the reconfiguration message, the DRB that needs to be reconfigured.

Optionally, the user equipment releases, according to the identifier of the secondary serving cell that needs to be deleted, the secondary serving cell that needs to be deleted.

In still another link failure recovery method provided in this embodiment, a signaling radio bearer between a user equipment and a primary base station does not need to be re-established, and security between the user equipment and the primary base station does not need to be reactivated, avoiding unnecessary information interaction between the user equipment and the primary base station, and improving network resource utilization efficiency.

Figure 4:
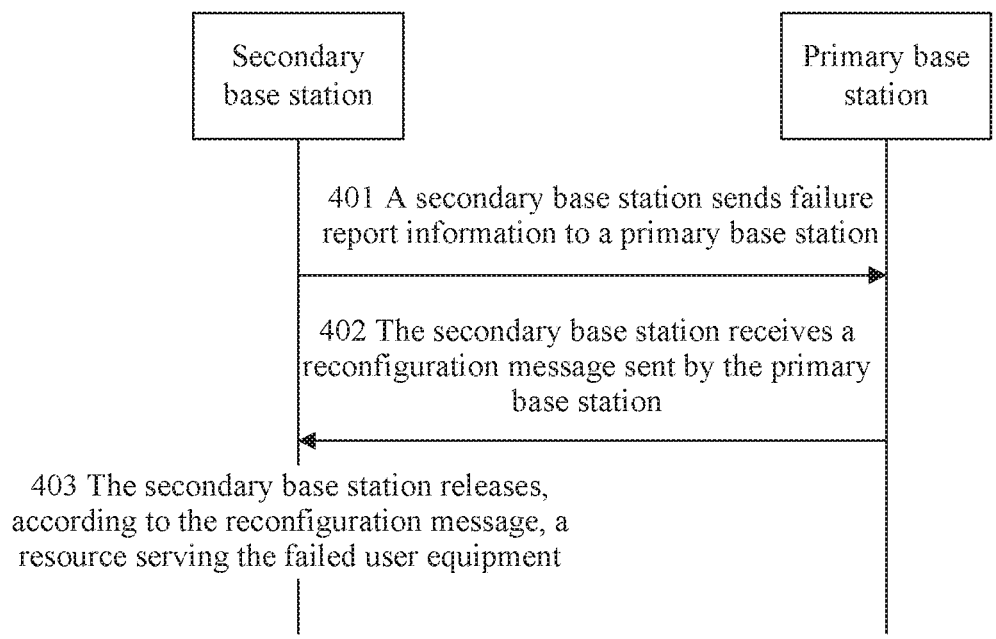
FIG. 4 is a flowchart of yet another link failure recovery method according to an embodiment of the present disclosure.

An embodiment of the present disclosure provides yet another link failure recovery method. As shown in FIG. 4, the method includes:

401. A secondary base station sends failure report information to a primary base station, so that the primary base station acquires, according to the failure report information, an identifier of a DRB that needs to be reconfigured and reconfigures a parameter for the DRB that needs to be reconfigured.

The failure report information is an identifier of a failed user equipment.

Optionally, the failure report information may further include an identifier of a failed secondary serving cell or an identifier of a failed radio access bearer E-RAB.

Optionally, before step 401, the method may further include: receiving, by the secondary base station, a failure detection configuration message sent by the primary base station, where the message may specifically include one or more of the following: the maximum number of RLC downlink retransmissions, the maximum number of retransmissions of a PDCCH order for allocating a dedicated random access resource, the maximum number of attempts for receiving a random access request, and a threshold for a block error rate (BLER) or a bit error rate (BER) of uplink data. The secondary base station determines, according to the failure detection configuration message, the identifier of the failed user equipment, and the identifier of the failed secondary serving cell or the identifier of the failed E-RAB.

Specifically, when the maximum number of RLC downlink retransmissions is reached for the DRB carried by the secondary base station, or the threshold for the BLER or the BER of the uplink data is reached, the secondary base station determines that an identifier of a user equipment to which the DRB belongs is the identifier of the failed user equipment, and the secondary base station determines that an identifier of a secondary serving cell that carries the DRB is the identifier of the failed secondary serving cell, or the secondary base station determines that an identifier of an E-RAB corresponding to the DRB is the identifier of the failed E-RAB. When the maximum number of retransmissions is reached for the PDCCH order that is used for allocating a dedicated random access resource and sent by the secondary base station to the user equipment, or the maximum number of attempts for receiving a random access request sent by the user equipment is reached, the secondary base station determines that the identifier of the user equipment is the identifier of the failed user equipment, and the secondary base station determines that the identifier of the secondary serving cell that sends the PDCCH order or receives the random access request is the identifier of the failed secondary serving cell, or the secondary base station determines that an identifier of an E-RAB corresponding to the DRB that is carried on a radio link between the failed user equipment and the failed secondary serving cell is the identifier of the failed E-RAB.

402. Optionally, the secondary base station receives a reconfiguration message sent by the primary base station.

The reconfiguration message includes the identifier of the failed user equipment.

Optionally, the reconfiguration message may further include an identifier of a secondary serving cell that needs to be deleted or an identifier of an E-RAB that needs to be deleted.

Specifically, when the failure report information is the identifier of the failed user equipment, the identifier of the secondary serving cell that needs to be deleted is an identifier of the secondary serving cell that serves the failed user equipment, and the identifier of the radio access bearer E-RAB that needs to be deleted is an identifier of an E-RAB corresponding to a DRB that is carried on a radio link between the secondary base station and the failed user equipment. When the failure report information is the identifier of the failed user equipment and the identifier of the failed secondary serving cell, the identifier of the secondary serving cell that needs to be deleted is the identifier of the failed secondary serving cell, and the identifier of the radio access bearer E-RAB that needs to be deleted is the identifier of the E-RAB corresponding to the DRB that is carried on the radio link between the failed user equipment and the failed secondary serving cell. When the failure report information is the identifier of the failed user equipment and the identifier of the failed radio access bearer E-RAB, the identifier of the secondary serving cell that needs to be deleted is an identifier of a secondary serving cell that carries the failed radio access bearer E-RAB, and the identifier of the radio access bearer E-RAB that needs to be deleted is the identifier of the failed radio access bearer E-RAB.

403. Optionally, the secondary base station releases, according to the reconfiguration message, a resource serving the failed user equipment.

Optionally, the secondary base station may release, according to the identifier of the failed user equipment and the identifier of the secondary serving cell that needs to be deleted, the secondary serving cell that needs to be deleted and serves the failed user equipment, or the secondary base station may release, according to the identifier of the failed user equipment and the identifier of the radio access bearer E-RAB that needs to be deleted, the E-RAB that needs to be deleted.

In yet another link failure recovery method provided in this embodiment, a signaling radio bearer between a user equipment and a primary base station does not need to be re-established, and security between the user equipment and the primary base station does not need to be reactivated, avoiding unnecessary information interaction between the user equipment and the primary base station, and improving network resource utilization efficiency.

Figure 5:
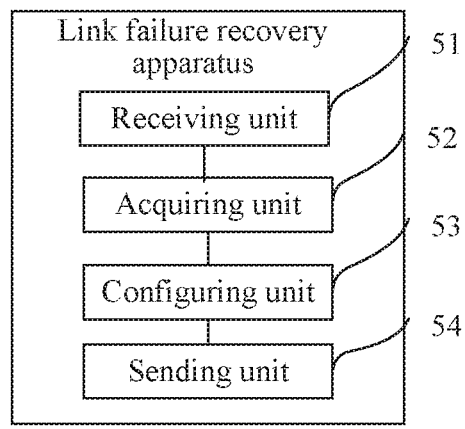
FIG. 5 is a schematic structural diagram of a link failure recovery apparatus according to an embodiment of the present disclosure.

An embodiment of the present disclosure provides a link failure recovery apparatus. As shown in FIG. 5, the apparatus includes: a receiving unit 51, an acquiring unit 52, a configuring unit 53, and a sending unit 54.

The receiving unit 51 may be configured to receive failure report information sent by a user equipment, where the failure report information is an identifier of a failed secondary serving cell or an identifier of a failed data radio bearer DRB, where the failed secondary serving cell is controlled by a secondary base station, and the failed DRB is carried on a radio link between the failed secondary serving cell and the user equipment.

The receiving unit 51 may be further configured to receive failure cause information sent by the user equipment, where the failure cause information is that the maximum number of RLC uplink retransmissions is reached, or that the maximum number of random access preamble retransmissions is reached, or that a timer T310 expires.

Optionally, before the receiving unit 51 receives the failure report information or failure cause information sent by the user equipment, the sending unit 54 may further send a failure detection configuration message to the user equipment, where the message may specifically include one or more of the following: the maximum number of RLC uplink retransmissions, the maximum number of random access preamble retransmissions, and timing duration of the timer T310, so that the user equipment determines, according to the failure detection configuration message, the identifier of the failed secondary serving cell or the identifier of the failed DRB or a specific value of the failure cause information.

Specifically, when the maximum number of RLC uplink retransmissions is reached for the DRB that is carried on the radio link between the user equipment and the secondary serving cell, the user equipment determines that an identifier of the secondary serving cell is the identifier of the failed secondary serving cell, or the user equipment determines that an identifier of the DRB is the identifier of the failed DRB. When the maximum number of random access preamble retransmissions is reached, or the timing duration of the timer T310 is reached on the secondary serving cell for the user equipment, the user equipment determines that an identifier of the secondary serving cell is the identifier of the failed secondary serving cell, or the user equipment determines that an identifier of the DRB that is carried on the radio link between the user equipment and the secondary serving cell is the identifier of the failed DRB.

The acquiring unit 52 may be configured to acquire, according to the failure report information, an identifier of a DRB that needs to be reconfigured.

Specifically, when the failure report information is the identifier of the failed secondary serving cell, the identifier that is acquired by the acquiring unit 52 and is of the DRB that needs to be reconfigured is the identifier of the DRB that is carried on the radio link between the failed secondary serving cell and the user equipment. When the failure report information is the identifier of the failed DRB, the identifier that is acquired by the acquiring unit 52 and is of the DRB that needs to be reconfigured is the identifier of the failed DRB.

The acquiring unit 52 may be further configured to acquire, according to the failure report information, an identifier of a secondary serving cell that needs to be deleted or an identifier of a radio access bearer E-RAB that needs to be deleted, where the E-RAB corresponds, on a one-to-one basis, to the DRB.

Specifically, when the failure report information is the identifier of the failed secondary serving cell, the identifier that is acquired by the acquiring unit 52 and is of the secondary serving cell that needs to be deleted is the identifier of the failed secondary serving cell, and the acquired identifier of the radio access bearer E-RAB that needs to be deleted is an identifier of an E-RAB corresponding to the DRB that is carried on the radio link between the failed secondary serving cell and the user equipment. When the failure report information is the identifier of the failed radio data bearer DRB, the identifier that is acquired by the acquiring unit 52 and is of the secondary serving cell that needs to be deleted is an identifier of a secondary serving cell that carries the failed DRB, and the acquired identifier of the radio access bearer E-RAB that needs to be deleted is the identifier of the E-RAB corresponding to the failed DRB.

The configuring unit 53 may be configured to reconfigure a parameter for the DRB that needs to be reconfigured.

The configuring unit 53 may be specifically configured to, when the failure cause information is that the maximum number of RLC uplink retransmissions is reached, reconfigure the maximum number of RLC uplink retransmissions for the DRB.

The configuring unit 53 may be specifically further configured to, when the failure cause information is that the maximum number of random access preamble retransmissions is reached, reconfigure the maximum number of preamble transmissions for the DRB.

The configuring unit 53 may be specifically further configured to, when the failure cause information is that a timer T310 expires, reconfigure timing duration of the timer T310 for the DRB.

The sending unit 54 may be configured to send a first reconfiguration message to the user equipment, where the first reconfiguration message includes the identifier of the DRB that needs to be reconfigured and the parameter reconfigured for the DRB, so that the user equipment reconfigures, according to the first reconfiguration message, the DRB that needs to be reconfigured.

Optionally, the first reconfiguration message may further include the identifier of the secondary serving cell that needs to be deleted, so that the user equipment releases, according to the identifier of the secondary serving cell that needs to be deleted, the secondary serving cell that needs to be deleted.

The sending unit 54 may be further configured to send a second reconfiguration message to the secondary base station, where the second reconfiguration message includes an identifier of the user equipment, so that the secondary base station releases, according to the identifier of the user equipment, a resource serving the user equipment.

The second reconfiguration message may further include the identifier of the secondary serving cell that needs to be deleted or the identifier of the E-RAB that needs to be deleted, so that the secondary base station releases, according to the second reconfiguration message, the secondary serving cell that needs to be deleted or the E-RAB that needs to be deleted.

A link failure recovery apparatus provided in this embodiment may avoid unnecessary information interaction and improve network resource utilization efficiency.

Figure 6:
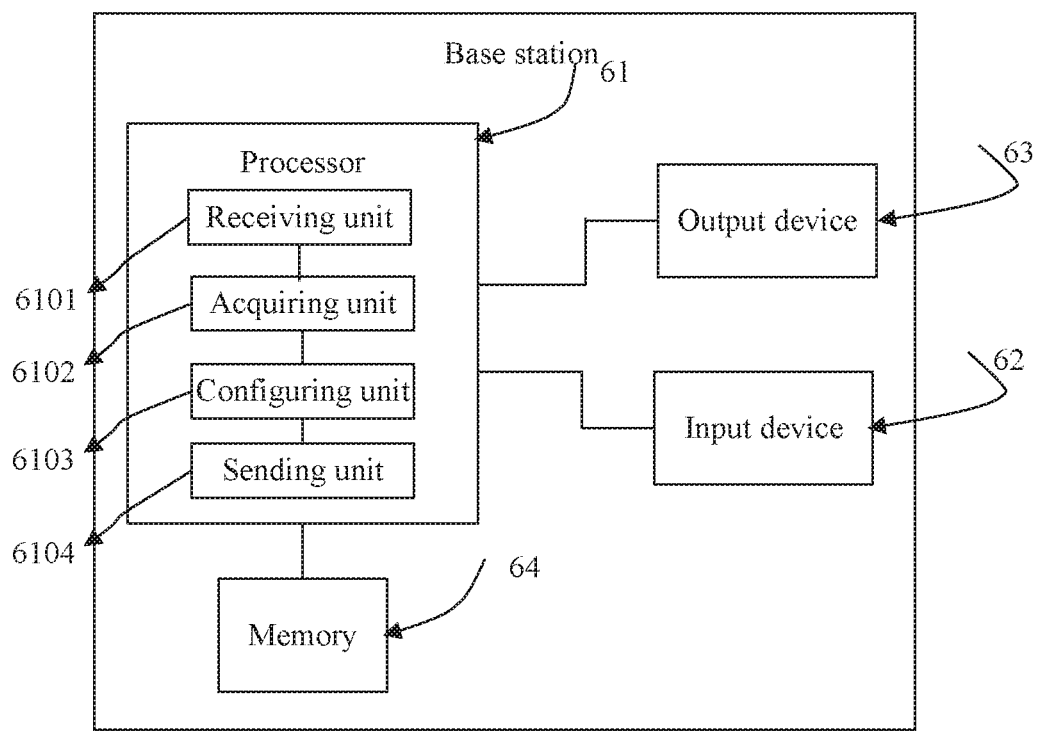
FIG. 6 is a schematic structural diagram of a base station according to an embodiment of the present disclosure.

An entity of a link failure recovery apparatus provided in an embodiment may be a base station. As shown in FIG. 6, the base station includes: a processor 61, an input device 62, an output device 63, and a memory 64, where the input device 62, the output device 63, and the memory 64 are connected to the processor 61.

The processor 61 includes: a receiving unit 6101, an acquiring unit 6102, a configuring unit 6103, and a sending unit 6104.

The receiving unit 6101 may be configured to receive failure report information sent by a user equipment, where the failure report information is an identifier of a failed secondary serving cell or an identifier of a failed data radio bearer DRB, where the failed secondary serving cell is controlled by a secondary base station, and the failed DRB is carried on a radio link between the failed secondary serving cell and the user equipment.

The receiving unit 6101 may be further configured to receive failure cause information sent by the user equipment, where the failure cause information is that the maximum number of RLC uplink retransmissions is reached, or that the maximum number of random access preamble retransmission s is reached, or that a timer T310 expires.

The acquiring unit 6102 may be configured to acquire, according to the failure report information, an identifier of a DRB that needs to be reconfigured.

The acquiring unit 6102 may be further configured to acquire, according to the failure report information, an identifier of a secondary serving cell that needs to be deleted or an identifier of a radio access bearer E-RAB that needs to be deleted, where the E-RAB corresponds, on a one-to-one basis, to the DRB.

The configuring unit 6103 may be configured to reconfigure a parameter for the DRB that needs to be reconfigured.

The configuring unit 6103 may be specifically configured to, when the failure cause information is that the maximum number of RLC uplink retransmissions is reached, reconfigure the maximum number of RLC uplink retransmissions for the DRB.

The configuring unit 6103 may be specifically further configured to, when the failure cause information is that the maximum number of random access preamble retransmissions is reached, reconfigure the maximum number of preamble transmissions for the DRB.

The configuring unit 6103 may be specifically further configured to, when the failure cause information is that a timer T310 expires, reconfigure timing duration of the timer T310 for the DRB.

The sending unit 6104 may be configured to send a first reconfiguration message to the user equipment, where the first reconfiguration message includes the identifier of the DRB that needs to be reconfigured and the parameter reconfigured for the DRB, so that the user equipment reconfigures, according to the first reconfiguration message, the DRB that needs to be reconfigured.

Optionally, the first reconfiguration message may further include the identifier of the secondary serving cell that needs to be deleted, so that the user equipment releases, according to the identifier of the secondary serving cell that needs to be deleted, the secondary serving cell that needs to be deleted.

The sending unit 6104 may be further configured to send a second reconfiguration message to the secondary base station, where the second reconfiguration message includes an identifier of the user equipment, so that the secondary base station releases, according to the identifier of the user equipment, a resource serving the user equipment.

The second reconfiguration message may further include the identifier of the secondary serving cell that needs to be deleted or the identifier of the E-RAB that needs to be deleted, so that the secondary base station releases, according to the second reconfiguration message, the secondary serving cell that needs to be deleted or the E-RAB that needs to be deleted.

Figure 7:
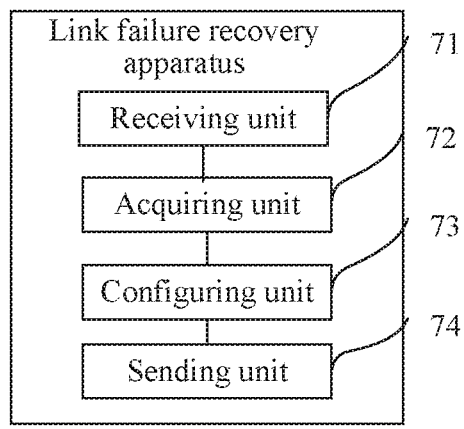
FIG. 7 is a schematic structural diagram of another link failure recovery apparatus according to an embodiment of the present disclosure.

An embodiment of the present disclosure provides another link failure recovery apparatus. As shown in FIG. 7, the apparatus includes: a receiving unit 71, an acquiring unit 72, a configuring unit 73, and a sending unit 74.

The receiving unit 71 may be configured to receive failure report information sent by a secondary base station, where the failure report information includes an identifier of a failed user equipment.

Optionally, the failure report information further includes an identifier of a failed secondary serving cell or an identifier of a failed radio access bearer E-RAB.

Optionally, before the receiving unit 71 receives the failure report information sent by the secondary base station, the sending unit 64 may send a failure detection configuration message to the secondary base station, where the message may specifically include one or more of the following: the maximum number of RLC downlink retransmissions, the maximum number of retransmissions of a physical downlink control channel (PDCCH) order for allocating a dedicated random access resource, the maximum number of attempts for receiving a random access request, and a threshold for a block error rate (BLER, Block Error Rate) or a bit error rate (BER, Bit Error Rate) of uplink data, so that the secondary base station determines, according to the failure detection configuration message, the identifier of the failed user equipment, and the identifier of the failed secondary serving cell or the identifier of the failed E-RAB.

Specifically, when the maximum number of RLC downlink retransmissions is reached, or the threshold for the BLER or the BER of the uplink data is reached for the DRB carried by the secondary base station, the secondary base station determines that an identifier of a user equipment to which the DRB belongs is the identifier of the failed user equipment, and the secondary base station determines that an identifier of a secondary serving cell that carries the DRB is the identifier of the failed secondary serving cell, or the secondary base station determines that an identifier of an E-RAB corresponding to the DRB is the identifier of the failed E-RAB. When the maximum number of retransmissions is reached for the PDCCH order that is used for allocating a dedicated random access resource and sent by the secondary base station to the user equipment, or the maximum number of attempts for receiving a random access request sent by the user equipment is reached, the secondary base station determines that the identifier of the user equipment is the identifier of the failed user equipment, and the secondary base station determines that the identifier of the secondary serving cell that sends the PDCCH order or receives the random access request is the identifier of the failed secondary serving cell, or the secondary base station determines that an identifier of an E-RAB corresponding to the DRB that is carried on the radio link between the failed user equipment and the failed secondary serving cell is the identifier of the failed E-RAB.

The acquiring unit 72 may be configured to acquire, according to the failure report information, an identifier of a data radio bearer DRB that needs to be reconfigured, and reconfigures a parameter for the DRB that needs to be reconfigured.

Specifically, when the failure report information is the identifier of the failed user equipment, the identifier that is acquired by the acquiring unit 72 and is of the data radio bearer DRB that needs to be reconfigured is an identifier of the DRB that is carried on a radio link between the failed user equipment and the secondary base station. When the failure report information is the identifier of the failed user equipment and the identifier of the failed secondary serving cell, the identifier that is acquired by the acquiring unit 72 and is of the data radio bearer DRB that needs to be reconfigured is the identifier of the DRB that is carried on the radio link between the failed user equipment and the failed secondary serving cell. When the failure report information is the identifier of the failed user equipment and the identifier of the failed radio access bearer E-RAB, the identifier that is acquired by the acquiring unit 72 and is of the data radio bearer DRB that needs to be reconfigured is the identifier of the DRB corresponding to the failed radio access bearer E-RAB.

The acquiring unit 72 may be further configured to acquire, according to the failure report information, an identifier of a secondary serving cell that needs to be deleted or an identifier of an E-RAB that needs to be deleted.

Specifically, when the failure report information is the identifier of the failed user equipment, the identifier that is acquired by the acquiring unit 72 and is of the secondary serving cell that needs to be deleted is an identifier of a secondary serving cell that serves the failed user equipment, and the identifier of the radio access bearer E-RAB that needs to be deleted is an identifier of an E-RAB corresponding to the DRB that is carried on the radio link between the secondary base station and the failed user equipment. When the failure report information is the identifier of the failed user equipment and the identifier of the failed secondary serving cell, the identifier that is acquired by the acquiring unit 72 and is of the secondary serving cell that needs to be deleted is the identifier of the failed secondary serving cell, and the identifier of the radio access bearer E-RAB that needs to be deleted is the identifier of the E-RAB corresponding to the DRB that is carried on the radio link between the failed user equipment and the failed secondary serving cell. When the failure report information is the identifier of the failed user equipment and the identifier of the failed radio access bearer E-RAB, the identifier that is acquired by the acquiring unit 62 and is of the secondary serving cell that needs to be deleted is an identifier of a secondary serving cell that carries the failed radio access bearer E-RAB, and the identifier of the radio access bearer E-RAB that needs to be deleted is the identifier of the failed radio access bearer E-RAB.

The configuring unit 73 may be configured to reconfigure a parameter for the DRB that needs to be reconfigured.

The sending unit 74 may be configured to send a first reconfiguration message to the user equipment, where the first reconfiguration message includes the identifier of the DRB that needs to be reconfigured and the parameter reconfigured for the DRB, so that the user equipment reconfigures, according to the first reconfiguration message, the DRB that needs to be reconfigured.

Optionally, the first reconfiguration message may further include the identifier of the secondary serving cell that needs to be deleted, so that the user equipment releases, according to the identifier of the secondary serving cell that needs to be deleted, the secondary serving cell that needs to be deleted.

The sending unit 74 may be further configured to send a second reconfiguration message to the secondary base station, where the second reconfiguration message includes the identifier of the failed user equipment, so that the secondary base station releases, according to the second reconfiguration message, a resource serving the failed user equipment.

Optionally, the second reconfiguration message may further include the identifier of the secondary serving cell that needs to be deleted or the identifier of the E-RAB that needs to be deleted, so that the secondary base station releases, according to the second reconfiguration message, the secondary serving cell that needs to be deleted or the E-RAB that needs to be deleted.

Another link failure recovery apparatus provided in this embodiment may avoid unnecessary information interaction and improve network resource utilization efficiency.

Figure 8:
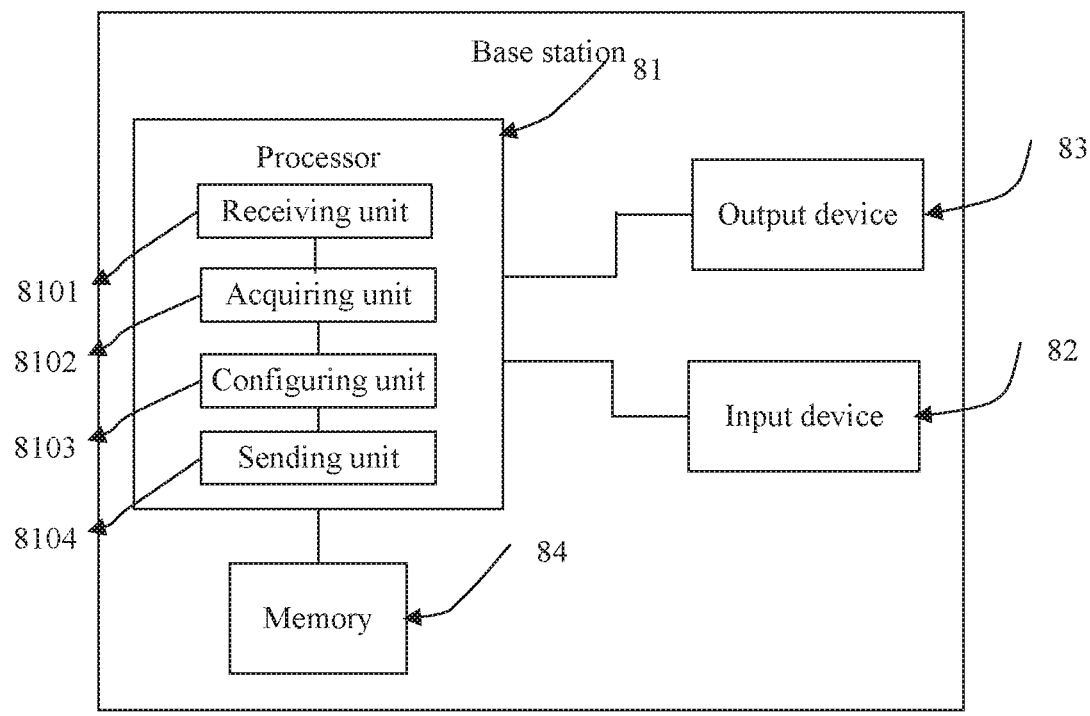
FIG. 8 is a schematic structural diagram of another base station according to an embodiment of the present disclosure.

An entity of another link failure recovery apparatus provided in an embodiment may be a base station. As shown in FIG. 8, the base station includes: a processor 81, an input device 82, an output device 83, and a memory 84, where the input device 82, the output device 83, and the memory 84 are connected to the processor 81.

The processor 81 may include: a receiving unit 8101, an acquiring unit 8102, a configuring unit 8103, and a sending unit 8104.

The receiving unit 8101 may be configured to receive failure report information sent by a secondary base station, where the failure report information includes an identifier of a failed user equipment.

Optionally, the failure report information further includes an identifier of a failed secondary serving cell or an identifier of a failed radio access bearer E-RAB.

Optionally, before the receiving unit 8101 receives the failure report information sent by the secondary base station, the sending unit 8104 may send a failure detection configuration message to the secondary base station, where the message may specifically include one or more of the following: the maximum number of RLC downlink retransmissions, the maximum number of retransmissions of a physical downlink control channel (PDCCH) order for allocating a dedicated random access resource, the maximum number of attempts for receiving a random access request, and a threshold for a block error rate (BLER) or a bit error rate (BER) of uplink data, so that the secondary base station determines, according to the failure detection configuration message, the identifier of the failed user equipment, and the identifier of the failed secondary serving cell or the identifier of the failed E-RAB.

The acquiring unit 8102 may be configured to acquire, according to the failure report information, an identifier of a data radio bearer DRB that needs to be reconfigured, and reconfigures a parameter for the DRB that needs to be reconfigured.

The acquiring unit 8102 may be further configured to acquire, according to the failure report information, an identifier of a secondary serving cell that needs to be deleted or an identifier of an E-RAB that needs to be deleted.

The configuring unit 8103 may be configured to reconfigure a parameter for the DRB that needs to be reconfigured.

The sending unit 8104 may be configured to send a first reconfiguration message to the user equipment, where the first reconfiguration message includes the identifier of the DRB that needs to be reconfigured and the parameter reconfigured for the DRB, so that the user equipment reconfigures, according to the first reconfiguration message, the DRB that needs to be reconfigured.

Optionally, the first reconfiguration message may further include the identifier of the secondary serving cell that needs to be deleted, so that the user equipment releases, according to the identifier of the secondary serving cell that needs to be deleted, the secondary serving cell that needs to be deleted.

The sending unit 8104 may be further configured to send a second reconfiguration message to the secondary base station, where the second reconfiguration message includes the identifier of the failed user equipment, so that the secondary base station releases, according to the second reconfiguration message, a resource serving the failed user equipment.

Optionally, the second reconfiguration message may further include the identifier of the secondary serving cell that needs to be deleted or the identifier of the E-RAB that needs to be deleted, so that the secondary base station releases, according to the second reconfiguration message, the secondary serving cell that needs to be deleted or the E-RAB that needs to be deleted.

Figure 9:
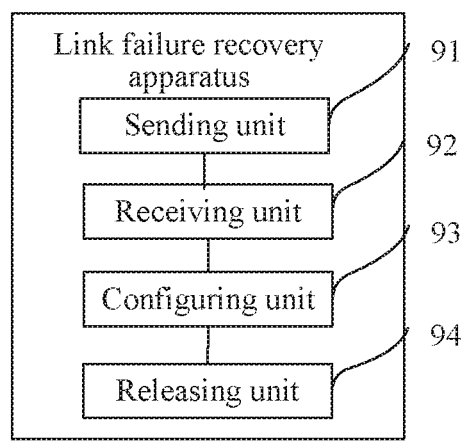
FIG. 9 is a schematic structural diagram of still another link failure recovery apparatus according to an embodiment of the present disclosure.

An embodiment of the present disclosure provides still another link failure recovery apparatus. As shown in FIG. 9, the apparatus includes: a sending unit 91, a receiving unit 92, a configuring unit 93, and a releasing unit 94.

The sending unit 91 may be configured to send failure report information to a primary base station.

The failure report information is an identifier of a failed secondary serving cell or an identifier of a failed data radio bearer DRB, where the failed secondary serving cell is controlled by a secondary base station, and the failed DRB is carried on a radio link between the failed secondary serving cell and a user equipment, so that the primary base station acquires, according to the failure report information, an identifier of a DRB that needs to be reconfigured, and reconfigures a parameter for the DRB that needs to be reconfigured.

The sending unit 91 may be further configured to send failure cause information to the primary base station.

The failure cause is that the maximum number of RLC uplink retransmissions is reached, or that the maximum number of random access preamble retransmissions is reached, or that a timer T310 expires, so that the primary base station reconfigures, according to the failure cause information, a parameter for the DRB that needs to be reconfigured.

Optionally, before the sending unit 91 sends the failure report information or the failure cause information to the primary base station, the receiving unit 92 may receive a failure detection configuration message sent by the primary base station, where the message may specifically include one or more of the following: the maximum number of RLC uplink retransmissions, the maximum number of random access preamble retransmissions, and timing duration of the timer T310, so that the user equipment determines, according to the failure detection configuration message, the identifier of the failed secondary serving cell or the identifier of the failed DRB or a specific value of the failure cause.

Specifically, when the maximum number of RLC uplink retransmissions is reached for the DRB that is carried on the radio link between the user equipment and the secondary serving cell, the user equipment determines that an identifier of the secondary serving cell is the identifier of the failed secondary serving cell, or the user equipment determines that an identifier of the DRB is the identifier of the failed DRB. When the maximum number of random access preamble retransmissions or the timing duration of the timer T310 is reached on the secondary serving cell for the user equipment, the user equipment determines that an identifier of the secondary serving cell is the identifier of the failed secondary serving cell, or the user equipment determines that an identifier of the DRB that is carried on the radio link between the user equipment and the secondary serving cell is the identifier of the failed DRB.

The receiving unit 92 may be configured to receive a reconfiguration message sent by the primary base station.

The reconfiguration message includes the identifier of the DRB that needs to be reconfigured and the parameter reconfigured for the DRB, so that the user equipment reconfigures, according to the reconfiguration message, the DRB that needs to be reconfigured.

Specifically, when the failure report information is the identifier of the failed secondary serving cell, the identifier of the DRB that needs to be reconfigured is an identifier of the DRB that is carried on the radio link between the failed secondary serving cell and the user equipment. When the failure report information is the identifier of the failed DRB, the identifier of the DRB that needs to be reconfigured is the identifier of the failed DRB.

The configuring unit 93 may be configured to reconfigure, according to the reconfiguration message, the failed DRB.

Optionally, the reconfiguration message may further include an identifier of a secondary serving cell that needs to be deleted.

Specifically, when the failure report information is the identifier of the failed secondary serving cell, the identifier of the secondary serving cell that needs to be deleted is the identifier of the failed secondary serving cell. When the failure report information is the identifier of the failed data radio bearer DRB, the identifier of the secondary serving cell that needs to be deleted is an identifier of a secondary serving cell that carries the failed DRB.

The releasing unit 94 may be configured to release, according to the identifier of the secondary serving cell that needs to be deleted, the secondary serving cell that needs to be deleted.

Still another link failure recovery apparatus provided in this embodiment may avoid unnecessary information interaction and improve network resource utilization efficiency.

Figure 10:
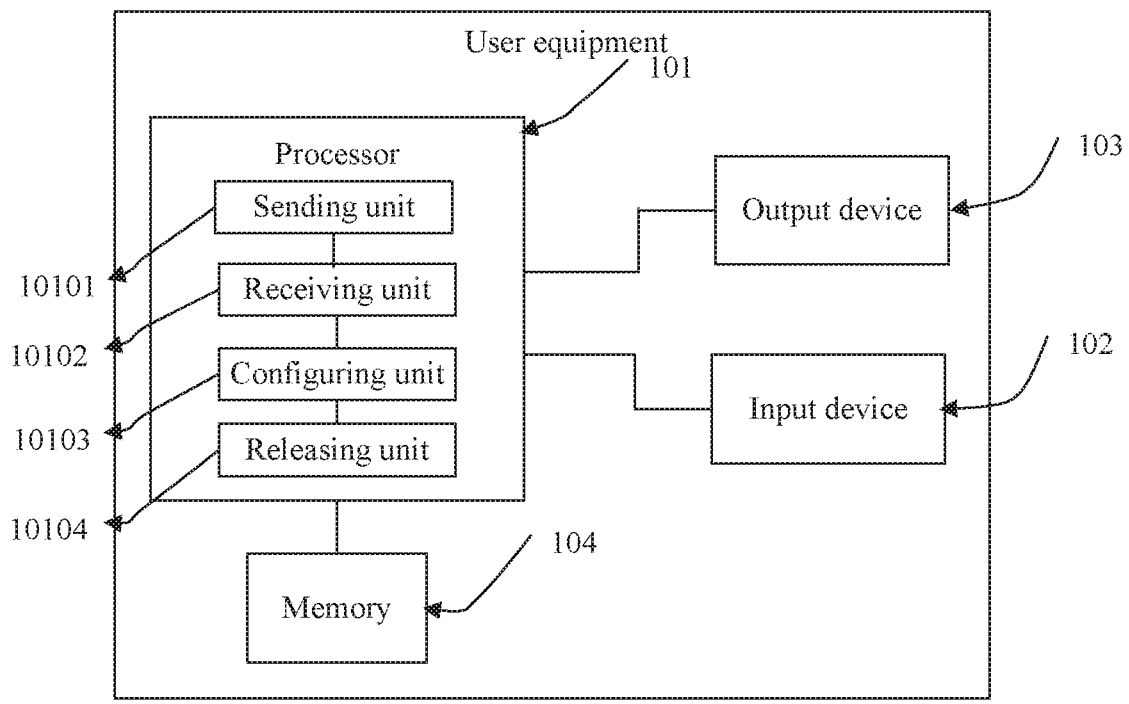
FIG. 10 is a schematic structural diagram of a user equipment according to an embodiment of the present disclosure.

An entity of still another link failure recovery apparatus provided in an embodiment may be a user equipment. As shown in FIG. 10, the user equipment includes: a processor 101, an input device 102, an output device 103, and a memory 104, where the input device 102, the output device 103, and the memory 104 are connected to the central processor 101.

The processor 101 may specifically include: a sending unit 10101, a receiving unit 10102, a configuring unit 10103, and a releasing unit 10104.

The sending unit 10101 may be configured to send failure report information to a primary base station.

The failure report information is an identifier of a failed secondary serving cell or an identifier of a failed data radio bearer DRB, where the failed secondary serving cell is controlled by a secondary base station, and the failed DRB is carried on a radio link between the failed secondary serving cell and a user equipment, so that the primary base station acquires, according to the failure report information, an identifier of a DRB that needs to be reconfigured, and reconfigures a parameter for the DRB that needs to be reconfigured.

The sending unit 10101 may be further configured to send failure cause information to the primary base station.

The failure cause is that the maximum number of RLC uplink retransmissions is reached, or that the maximum number of random access preamble retransmissions is reached, or that a timer T310 expires, so that the primary base station reconfigures, according to the failure cause information, a parameter for the DRB that needs to be reconfigured.

Optionally, before the sending unit 10101 sends the failure report information or the failure cause information to the primary base station, the receiving unit 10102 may receive a failure detection configuration message sent by the primary base station, where the message may specifically include one or more of the following: the maximum number of RLC uplink retransmissions, the maximum number of random access preamble retransmissions, and timing duration of the timer T310, so that the user equipment determines, according to the failure detection configuration message, the identifier of the failed secondary serving cell or the identifier of the failed DRB or a specific value of the failure cause.

The receiving unit 10102 may be configured to receive a reconfiguration message sent by the primary base station.

The reconfiguration message includes the identifier of the DRB that needs to be reconfigured and the parameter reconfigured for the DRB, so that the user equipment reconfigures, according to the reconfiguration message, the DRB that needs to be reconfigured.

Specifically, when the failure report information is the identifier of the failed secondary serving cell, the identifier of the DRB that needs to be reconfigured is an identifier of the DRB that is carried on the radio link between the failed secondary serving cell and the user equipment. When the failure report information is the identifier of the failed DRB, the identifier of the DRB that needs to be reconfigured is the identifier of the failed DRB.

The configuring unit 10103 may be configured to reconfigure, according to the reconfiguration message, the failed DRB.

Optionally, the reconfiguration message may further include an identifier of a secondary serving cell that needs to be deleted.

Specifically, when the failure report information is the identifier of the failed secondary serving cell, the identifier of the secondary serving cell that needs to be deleted is the identifier of the failed secondary serving cell. When the failure report information is the identifier of the failed data radio bearer DRB, the identifier of the secondary serving cell that needs to be deleted is an identifier of a secondary serving cell that carries the failed DRB.

The releasing unit 10104 may be configured to release, according to the identifier of the secondary serving cell that needs to be deleted, the secondary serving cell that needs to be deleted.

Figure 11:
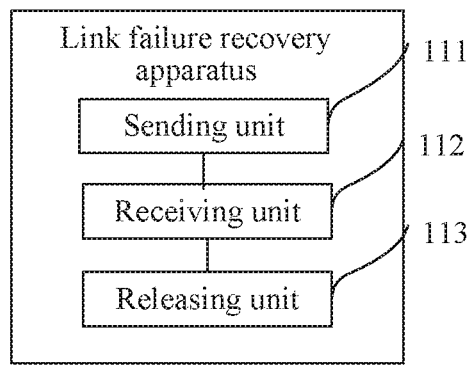
FIG. 11 is a schematic structural diagram of yet another link failure recovery apparatus according to an embodiment of the present disclosure.

An embodiment of the present disclosure provides yet another link failure recovery apparatus. As shown in FIG. 11, an entity of the apparatus may be a base station. The apparatus includes: a sending unit 111, a receiving unit 112, and a releasing unit 113.

The sending unit 111 may be configured to send failure report information to a primary base station, so that the primary base station acquires, according to the failure report information, an identifier of a DRB that needs to be reconfigured, and reconfigures a parameter for the DRB that needs to be reconfigured.

The failure report information is an identifier of a failed user equipment.

Optionally, the failure report information may further include an identifier of a failed secondary serving cell or an identifier of a failed radio access bearer E-RAB.

Optionally, before the sending unit 111 sends the failure report information to the primary base station, the receiving unit 112 may receive a failure detection configuration message sent by the primary base station, where the message may specifically include one or more of the following: the maximum number of RLC downlink retransmissions, the maximum number of retransmissions of a PDCCH order for allocating a dedicated random access resource, the maximum number of attempts for receiving a random access request, and a threshold for a block error rate (BLER) or a bit error rate (BER) of uplink data. The secondary base station determines, according to the failure detection configuration message, the identifier of the failed user equipment, and the identifier of the failed secondary serving cell or the identifier of the failed E-RAB.

Specifically, when the maximum number of RLC downlink retransmissions is reached for the DRB carried by the secondary base station, or the threshold for the BLER or the BER of the uplink data is reached, the secondary base station determines that an identifier of a user equipment to which the DRB belongs is the identifier of the failed user equipment, and the secondary base station determines that an identifier of a secondary serving cell that carries the DRB is the identifier of the failed secondary serving cell, or the secondary base station determines that an identifier of an E-RAB corresponding to the DRB is the identifier of the failed E-RAB. When the maximum number of retransmissions is reached for the PDCCH order that is used for allocating a dedicated random access resource and sent by the secondary base station to the user equipment, or the maximum number of attempts for receiving a random access request sent by the user equipment is reached, the secondary base station determines that the identifier of the user equipment is the identifier of the failed user equipment, and the secondary base station determines that the identifier of the secondary serving cell that sends the PDCCH order or receives the random access request is the identifier of the failed secondary serving cell, or the secondary base station determines that an identifier of an E-RAB corresponding to the DRB that is carried on a radio link between the failed user equipment and the failed secondary serving cell is the identifier of the failed E-RAB.

The receiving unit 112 may be configured to receive a reconfiguration message sent by the primary base station.

The reconfiguration message includes the identifier of the failed user equipment.

The releasing unit 113 may be configured to release, according to the reconfiguration message, a resource serving the failed user equipment.

Optionally, the reconfiguration message may further include an identifier of a secondary serving cell that needs to be deleted or an identifier of an E-RAB that needs to be deleted.

Specifically, when the failure report information is the identifier of the failed user equipment, the identifier of the secondary serving cell that needs to be deleted is an identifier of a secondary serving cell that serves the failed user equipment, and the identifier of the radio access bearer E-RAB that needs to be deleted is an identifier of an E-RAB corresponding to the DRB that is carried on a radio link between the secondary base station and the failed user equipment. When the failure report information is the identifier of the failed user equipment and the identifier of the failed secondary serving cell, the identifier of the secondary serving cell that needs to be deleted is the identifier of the failed secondary serving cell, and the identifier of the radio access bearer E-RAB that needs to be deleted is the identifier of the E-RAB corresponding to the DRB that is carried on the radio link between the failed user equipment and the failed secondary serving cell. When the failure report information is the identifier of the failed user equipment and the identifier of the failed radio access bearer E-RAB, the identifier of the secondary serving cell that needs to be deleted is an identifier of a secondary serving cell that carries the failed radio access bearer E-RAB, and the identifier of the radio access bearer E-RAB that needs to be deleted is the identifier of the failed radio access bearer E-RAB.

The releasing unit 113 may be further configured to release, according to the identifier of the failed user equipment and the identifier of the secondary serving cell that needs to be deleted, the secondary serving cell that needs to be deleted and serves the failed user equipment; or the releasing unit 113 may be further configured to release, according to the identifier of the failed user equipment and the identifier of the radio access bearer E-RAB that needs to be deleted, the E-RAB that needs to be deleted.

Yet another link failure recovery apparatus provided in this embodiment may avoid unnecessary information interaction and improve network resource utilization efficiency.

Figure 12:
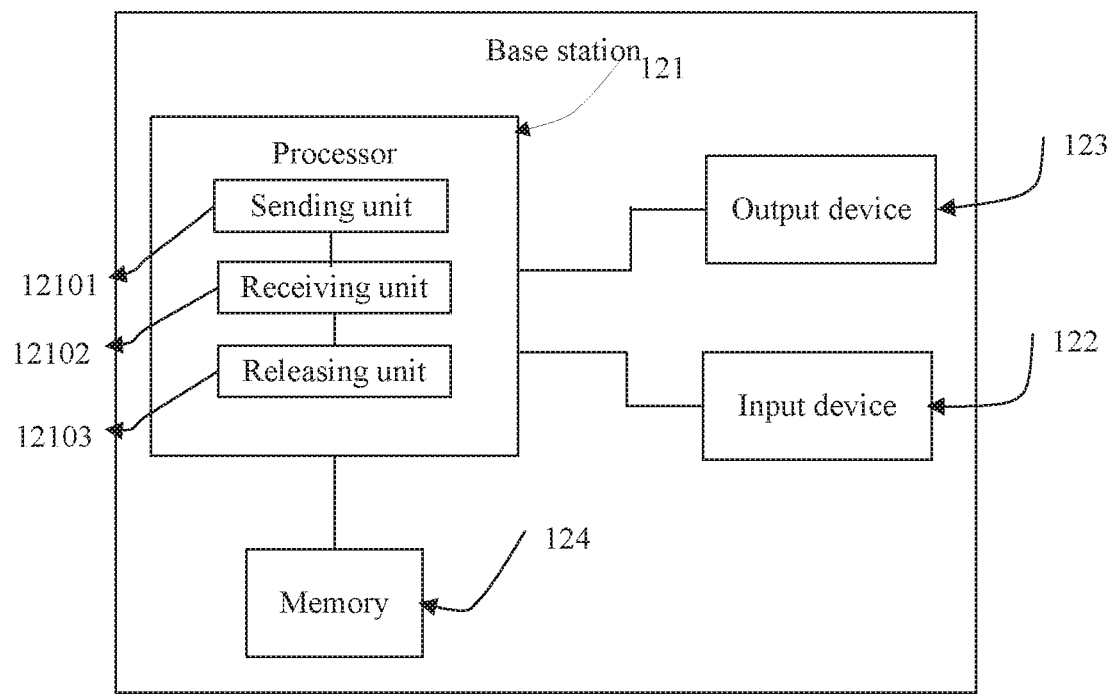
FIG. 12 is a schematic structural diagram of still another base station according to an embodiment of the present disclosure.

An entity of yet another link failure recovery apparatus provided in an embodiment may be a base station. As shown in FIG. 12, the base station includes: a processor 121, an input device 122, an output device 123, and a memory 124, where the input device 122, the output device 123, and the memory 124 are connected to the processor 121.

The processor 121 may specifically include: a sending unit 12101, a receiving unit 12102, and a releasing unit 12103.

The sending unit 12101 may be configured to send failure report information to a primary base station, so that the primary base station acquires, according to the failure report information, an identifier of a DRB that needs to be reconfigured, and reconfigures a parameter for the DRB that needs to be reconfigured.

The failure report information is an identifier of a failed user equipment.

Optionally, the failure report information may further include an identifier of a failed secondary serving cell or an identifier of a failed radio access bearer E-RAB.

Optionally, before the sending unit 12101 sends the failure report information to the primary base station, the receiving unit 12102 may receive a failure detection configuration message sent by the primary base station, where the message may specifically include one or more of the following: the maximum number of RLC downlink retransmissions, the maximum number of retransmissions of a PDCCH order for allocating a dedicated random access resource, the maximum number of attempts for receiving a random access request, and a threshold for a block error rate (BLER) or a bit error rate (BER) of uplink data. The secondary base station determines, according to the failure detection configuration message, the identifier of the failed user equipment, and the identifier of the failed secondary serving cell or the identifier of the failed E-RAB.

The receiving unit 12102 may be configured to receive a reconfiguration message sent by the primary base station.

The reconfiguration message includes the identifier of the failed user equipment.

The releasing unit 12103 may be configured to release, according to the reconfiguration message, a resource serving the failed user equipment.

Optionally, the reconfiguration message may further include an identifier of a secondary serving cell that needs to be deleted or an identifier of an E-RAB that needs to be deleted.

The releasing unit 12103 may be further configured to release, according to the identifier of the failed user equipment and the identifier of the secondary serving cell that needs to be deleted, the secondary serving cell that needs to be deleted and serves the failed user equipment; or the releasing unit 12103 may be further configured to release, according to the identifier of the failed user equipment and the identifier of the radio access bearer E-RAB that needs to be deleted, the E-RAB that needs to be deleted.

In a link failure recovery method and apparatus provided in embodiments of the present disclosure, a primary base station first receives failure report information sent by a user equipment, acquires, according to the failure report information, an identifier of a DRB that needs to be reconfigured, and reconfigures a parameter for the DRB that needs to be reconfigured; and then the primary base station sends a first reconfiguration message to the user equipment, so that the user equipment reconfigures a failed DRB according to the first reconfiguration message. Currently, when the user equipment detects that a radio link failure occurs on a link between the user equipment and a secondary base station, a signaling radio bearer between the user equipment and the primary base station is still re-established, and security between the user equipment and the primary base station is reactivated. However, probably no radio link failure occurs between the user equipment and the primary base station at this moment. As a result, unnecessary information interaction between the user equipment and the primary base station increases, and a network resource is wasted. In the method and apparatus provided in the embodiments of the present disclosure, the signaling radio bearer between the user equipment and the primary base station does not need to be re-established, and the security between the user equipment and the primary base station does not need to be reactivated, avoiding unnecessary information interaction between the user equipment and the primary base station, and improving network resource utilization efficiency. Further, the method and apparatus provided in the embodiments of the present disclosure may enable the primary base station to locate a failure cause more accurately, thereby implementing link failure recovery at a lower cost.

The link failure recovery apparatus provided in the embodiments of the present disclosure may implement the method embodiments provided in the foregoing. For detailed function implementation, reference may be made to descriptions in the method embodiments, and details are not described herein again. The link failure recovery method and apparatus provided in the embodiments of the present disclosure may be applied to the field of communications systems, but are not limited thereto.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (ROM), or a random access memory (RAM).

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A link failure recovery method, comprising:
determining, by a user equipment, a data radio bearer (DRB) that needs to be reconfigured;
sending, by the user equipment, failure report information to a primary base station, wherein:
the failure report information comprises an identifier of the DRB that needs to be reconfigured;
the DRB corresponds to a failed secondary serving cell controlled by a secondary base station; and
receiving, by the user equipment, a reconfiguration message from the primary base station that reconfigures the DRB that corresponds to the failed secondary serving cell controlled by the secondary base station.

2. The link failure recovery method according to claim 1, further comprising:
sending, by the user equipment, failure cause information to the primary base station, wherein the failure cause information is that the maximum number of Radio Link Control (RLC) uplink retransmissions is reached, or that the maximum number of random access preamble retransmissions is reached, or that a timer expires.

3. The link failure recovery method according to claim 2, wherein before sending the failure cause information to the primary base station, the method further comprises:
receiving, by the user equipment, a failure detection configuration message sent by the primary base station, wherein the failure detection configuration message comprises at least one of the following: the maximum number of RLC uplink retransmissions, the maximum number of random access preamble retransmissions, and timing duration of the timer; and
determining, by the user equipment according to the failure detection configuration message, a specific value of the failure cause information.

4. The link failure recovery method according to claim 1, wherein:
the failure report information is an identifier of a failed secondary serving cell or an identifier of a failed DRB; and
the failed DRB is carried on a radio link between the failed secondary serving cell and the user equipment.

5. A user equipment, comprising:
a processor configured to determine a data radio bearer (DRB) that needs to be reconfigured;
a transmitter configured to send failure report information to a primary base station, wherein:
the failure report information comprises an identifier of the DRB that needs to be reconfigured; and
the DRB corresponds to a failed secondary serving cell controlled by a secondary base station; and
a receiver configured to receive a reconfiguration message from the primary base station that reconfigures the DRB that corresponds to the failed secondary serving cell controlled by the secondary base station.

6. The user equipment according to claim 5, wherein the transmitter is further configured to:
send failure cause information to the primary base station, wherein the failure cause information is that the maximum number of Radio Link Control (RLC) uplink retransmissions is reached, or that the maximum number of random access preamble retransmissions is reached, or that a timer expires.

7. The user equipment according to claim 6, wherein the receiver is further configured to receive a failure detection configuration message sent by the primary base station, wherein the failure detection configuration message comprises at least one of the following: the maximum number of RLC uplink retransmissions, the maximum number of random access preamble retransmissions, and timing duration of the timer; and
wherein the processor is further configured to determine, according to the failure detection configuration message, a specific value of the failure cause information.

8. The user equipment according to claim 5, wherein:
the failure report information is an identifier of a failed secondary serving cell or an identifier of a failed DRB; and
the failed DRB is carried on a radio link between the failed secondary serving cell and the user equipment.

* * * * *